US010917923B2

(12) United States Patent
Cole et al.

(10) Patent No.: US 10,917,923 B2
(45) Date of Patent: Feb. 9, 2021

(54) RESOURCE OPTIMIZATION ALLOCATION SYSTEM

(71) Applicant: BANK OF AMERICA CORPORATION, Charlotte, NC (US)

(72) Inventors: Kevin T. Cole, Charlotte, NC (US); Matthew Hsieh, Charlotte, NC (US); Scott T. Enscoe, Charlotte, NC (US); Caitlin Chrisman Bullock, Durham, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/707,513

(22) Filed: Dec. 9, 2019

(65) Prior Publication Data
US 2020/0113003 A1 Apr. 9, 2020

Related U.S. Application Data

(63) Continuation of application No. 14/987,721, filed on Jan. 4, 2016, now Pat. No. 10,506,641.

(51) Int. Cl.
*G06F 15/173* (2006.01)
*H04W 76/10* (2018.01)
(Continued)

(52) U.S. Cl.
CPC ............ *H04W 76/10* (2018.02); *G06Q 40/02* (2013.01); *G06Q 20/32* (2013.01); *G06Q 40/00* (2013.01); *H04W 72/04* (2013.01)

(58) Field of Classification Search
CPC ...... H04W 76/10; H04W 72/04; G06Q 40/02; G06Q 20/32; G06Q 40/00
(Continued)

(56) References Cited

U.S. PATENT DOCUMENTS 7,698,222 B1   4/2010   Bueche, Jr.
7,792,748 B1   9/2010   Ebersole et al.
(Continued)

OTHER PUBLICATIONS

Rogowski M., Saeed K., Rybnik M., Tabedzki M., Adamski M. (2013) User Authentication for Mobile Devices. In: Saeed K., Chaki R., Cortesi A., Wierzchoń S. (eds) Computer Information Systems and Industrial Management. CISIM 2013. Lecture Notes in Computer Science, vol. 8104. (Year: 2013).*
(Continued)

*Primary Examiner* — Taylor A Elfervig
(74) *Attorney, Agent, or Firm* — Michael A. Springs; Moore & Van Allen PLLC; Vaidehi Bachoti

(57) ABSTRACT

Embodiments of the invention are directed to a system, method, or computer program product for resource optimization allocation via an interactive resource interface. In this way, the invention provides a comprehensive integrated platform for identification, continual monitoring and optimal allocation of resources on a mobile device. The invention enables identification of existing resources. In one aspect, the system identifies inflow resource transfers associated with a first resource. The system then determines if the inflow resource transfers are required for processing of critical tasks. Consequently, the system initiates a resource transfer, comprising at least a portion of the inflow resource transfer, from the first resource to a second user resource. Typically, the second resource is configured to promote resource accumulation. In another aspect of the invention, the system identifies a third user resource that is configured to foster resource growth, that is then linked with the second resource.

20 Claims, 7 Drawing Sheets

(51) Int. Cl.
*G06Q 40/02* (2012.01)
*G06Q 40/00* (2012.01)
*G06Q 20/32* (2012.01)
*H04W 72/04* (2009.01)

(58) Field of Classification Search
USPC ........................................................ 709/226
See application file for complete search history.

(56) References Cited

U.S. PATENT DOCUMENTS

| | | | |
|---|---|---|---|
| 8,788,389 | B1 | 7/2014 | Fernandes |
| 9,082,117 | B2* | 7/2015 | Chin .................... G06F 21/32 |
| 2002/0152145 | A1 | 10/2002 | Wanta et al. |
| 2004/0267665 | A1 | 12/2004 | Nam et al. |
| 2005/0150945 | A1 | 7/2005 | Choi |
| 2006/0195816 | A1 | 8/2006 | Grandcolas et al. |
| 2007/0011089 | A1 | 1/2007 | DeSchryver |
| 2007/0244811 | A1 | 10/2007 | Tumminaro |
| 2007/0255620 | A1 | 11/2007 | Tumminaro et al. |
| 2007/0265984 | A1 | 11/2007 | Santhana |
| 2007/0278290 | A1 | 12/2007 | Messerges et al. |
| 2008/0097851 | A1 | 4/2008 | Bemmel et al. |
| 2008/0126145 | A1 | 5/2008 | Rackley, III et al. |
| 2008/0167017 | A1 | 7/2008 | Wentker et al. |
| 2008/0207234 | A1 | 8/2008 | Arthur et al. |
| 2008/0208743 | A1 | 8/2008 | Arthur et al. |
| 2008/0228637 | A1 | 9/2008 | Scipioni et al. |
| 2008/0242274 | A1 | 10/2008 | Swanburg et al. |
| 2009/0076912 | A1 | 3/2009 | Rajan et al. |
| 2009/0094125 | A1 | 4/2009 | Killian et al. |
| 2009/0119190 | A1 | 5/2009 | Realini |
| 2009/0204916 | A1 | 8/2009 | Benedek et al. |
| 2009/0271287 | A1 | 10/2009 | Halpern |
| 2010/0094752 | A1 | 4/2010 | Heath |
| 2010/0191602 | A1 | 7/2010 | Mikkelsen et al. |
| 2010/0262449 | A1 | 10/2010 | Monteforte et al. |
| 2010/0305997 | A1 | 12/2010 | Ananian et al. |
| 2011/0106600 | A1 | 5/2011 | Malik et al. |
| 2011/0154485 | A1* | 6/2011 | Hyun .................... H04L 9/3231 726/19 |
| 2011/0213671 | A1* | 9/2011 | Hirson .................. G06Q 20/20 705/16 |
| 2013/0173319 | A1 | 7/2013 | Thomas et al. |
| 2013/0191789 | A1* | 7/2013 | Calman .................. G06F 3/017 715/863 |
| 2014/0058912 | A1 | 2/2014 | Bajaj |
| 2014/0067654 | A1* | 3/2014 | Hanson ............... G06Q 20/3223 705/39 |
| 2015/0170130 | A1 | 6/2015 | Patel et al. |
| 2015/0242941 | A1* | 8/2015 | Viswanath ........... G06F 3/0486 705/26.8 |
| 2016/0063487 | A1* | 3/2016 | Moreton .............. G06Q 20/357 705/67 |
| 2016/0086152 | A1 | 3/2016 | Shilkin |
| 2017/0011390 | A1* | 1/2017 | Hsieh ................. G06Q 20/3223 |
| 2017/0078621 | A1 | 3/2017 | Sahay et al. |
| 2017/0177135 | A1 | 6/2017 | Sarin |

OTHER PUBLICATIONS

Y. Lee, "Real-time mobile gesture-based authentication." http://www-ipv4.cl.cam.ac.uk/~lmrs2/student_projects/2014_Jason_SigVerify_partII.pdf, 2014. p. 1-96 (Year: 2014).*

A. Gupta, Y. Kumar and S. Malhotra, "Banking security system using hand gesture recognition," 2015 International Conference on Recent Developments in Control, Automation and Power Engineering (RDCAPE), Noida, 2015, pp. 243-246 (Year: 2015).*

E. Santos and D. Li, "On Deception Detection in Multiagent Systems," in IEEE Transactions on Systems, Man, and Cybernetics—Part A: Systems and Humans, vol. 40, No. 2, pp. 224-235, Mar. 2010 (Year: 2010).*

* cited by examiner

RESOURCE OPTIMIZATION ALLOCATION SYSTEM

CROSS-REFERENCE TO PRIORITY APPLICATION

This application is a continuation of and claims the benefit of U.S. Non-Provisional patent application Ser. No. 14/987,721 entitled "Resource Optimization Allocation System" filed on Jan. 4, 2016, which published on Jul. 6, 2017, as U.S. Patent Application Publication No. 2017/0195994, each of which is hereby incorporated by reference in its entirety.

FIELD

The present invention relates to identification, monitoring, tracking and optimal allocation of resources using a real-time interactive resource tracking and allocation platform.

BACKGROUND

Advancements in technology have made mobile devices with multi-faceted functionality ubiquitous. These developments have facilitated numerous methods for resource transfer and utilization. With the continued addition of new functions to these mobile devices, novel systems for detecting availability of resources at various sources/locations, monitoring resource transfers, ascertaining impact of resource transfers and configuring resource transfers for critical tasks and goals are desired. Additionally, a need exists for an integrated platform for presentation, tracking, configuration and optimal allocation of various resources, in real-time or near real-time, to ensure realization of critical tasks and goals and to facilitate resource growth.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for real-time resource tracking and allocation, whereby the system provides a comprehensive integrated platform for identification, monitoring and optimal allocation of resources in real-time. In this way, the invention provides a real-time overlay resource interface on a mobile device.

In one embodiment, the system may be configured to: establish an operative communication link with a mobile device associated with a user and provide a user resource application on the mobile device; determine user resources associated with the user, wherein determining user resources comprises analyzing mobile device data associated with the user; receive authorization credentials from the user to access the user resources; extract resource data from a source of each user resource associated with the user, wherein resource data comprises real-time resource level, resource transfer history, resource transfer schedules and user goals for each user resource; transform the extracted resource data into a textual format encrypted for use only on an automatic resource allocation interface associated with the user resource application; determine a transactional resource of the user resources comprising a transactional resource level; and identify at least one trigger event comprising an inflow resource transfer into a transactional resource of the user resources, wherein identifying the at least one trigger event comprises determining an inflow resource transfer value associated with the trigger event; determine a savings resource of the user resources comprising a savings resource level; and initiate, automatically and in real-time, an outflow resource transfer from the transactional resource such that at least a portion of the inflow resource transfer value is transferred to the savings resource, wherein the outflow resource transfer causes an increase in the savings resource level; and transmit control signals to the mobile device that cause the user resource application to present notifications associated with the current levels of user resources after the resource transfer.

In another embodiment, and in combination with the previous embodiment, the system may be configured to: determine a first user input comprising a first gesture; determine an investment resource based on correlating the first gesture with the investment resource, wherein the investment resource comprises an investment resource level; and initiate, automatically and in real-time, an outflow resource transfer from the savings resource to the investment resource, wherein the outflow resource transfer causes an decrease in the savings resource level.

In another embodiment, and in combination with any of the previous embodiments, transforming the extracted resource data into a textual format encrypted for use only on an interactive resource interface further includes preventing the data from being readable in any medium other than the interactive resource interface if data is removed from the interactive resource interface.

In another embodiment, and in combination with any of the previous embodiments, presenting the interactive resource interface further comprises receiving an approved authentication credential from the user based on an authentication request presented to the user, wherein the authentication request requires user input of authorization credentials for a randomly selected resource available to the user.

In another embodiment, and in combination with any of the previous embodiments, the system may be configured to: determining a user input comprising a second physical gesture; correlating the gesture with a first resource transfer value; and transferring the first resource transfer value from the transactional resource to the savings resource, based on determining that the transactional resource level is above a predetermined threshold value.

In another embodiment, and in combination with any of the previous embodiments, the predetermined threshold value is an aggregate resources values required for critical tasks of the user.

In another embodiment, and in combination with any of the previous embodiments, the system may be configured to: identify the at least one trigger event comprising an initiation of an outflow resource transfer from the transactional resource via a first application of the mobile device, wherein the first application is a third party application configured to allow the user to initiate resource transfers from user resources through a first interface presented on the display; generate a contextual visual representation of a goal product or service for the user resources; present the generated contextual visual representation on the display associated with the mobile device, wherein the generated contextual visual representation upon presentation, locks the functionality of the first application for a predetermined time period; and restrict the outflow resource transfer until the identification of a second trigger event, wherein the second trigger event comprises at least one of elapse of the predetermined time period and receiving a user input comprising reallocation of the outflow resource transfer to the savings resource.

In another embodiment, and in combination with any of the previous embodiments, the user resources comprise financial resources of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
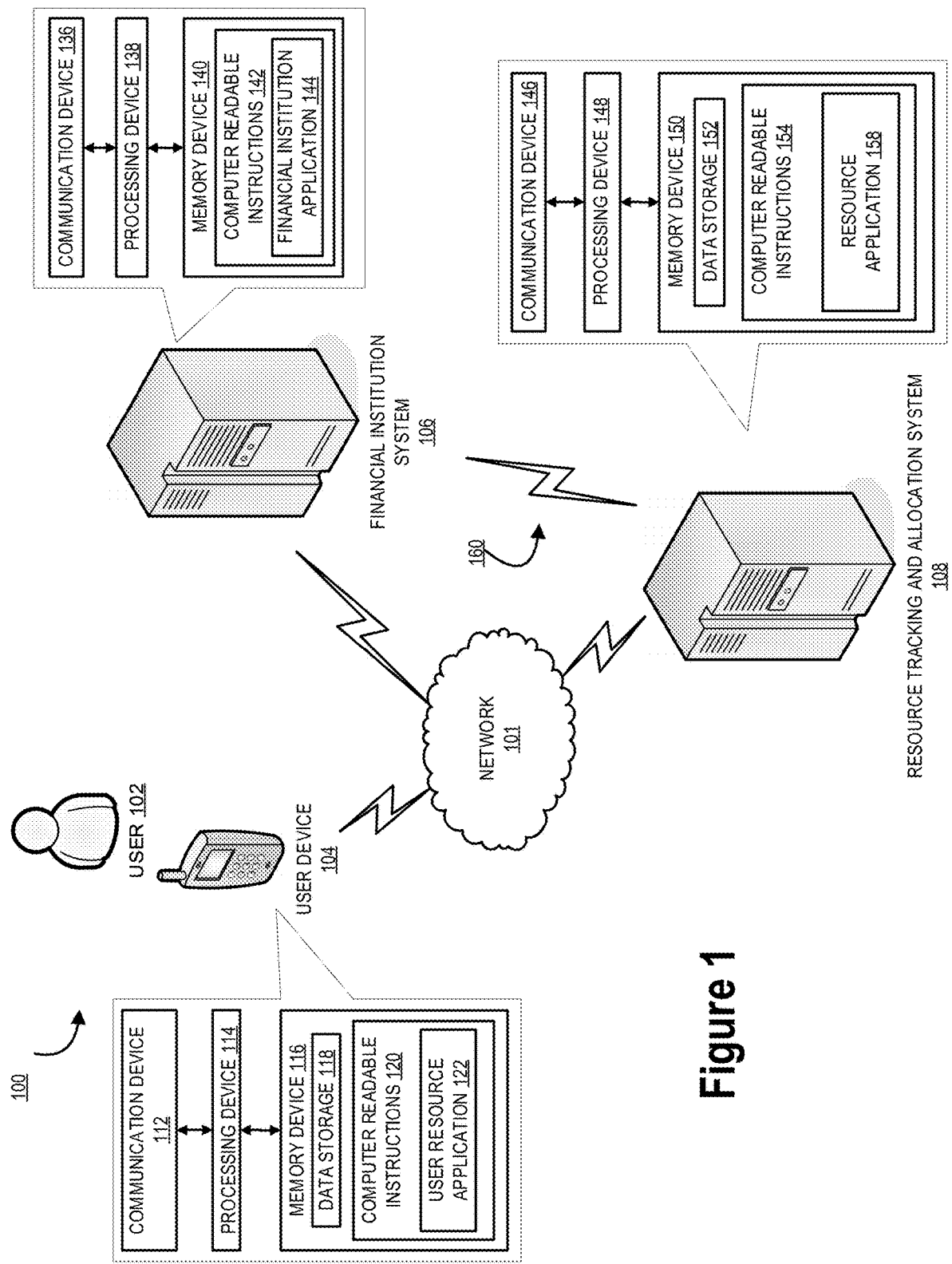
Figure 2:
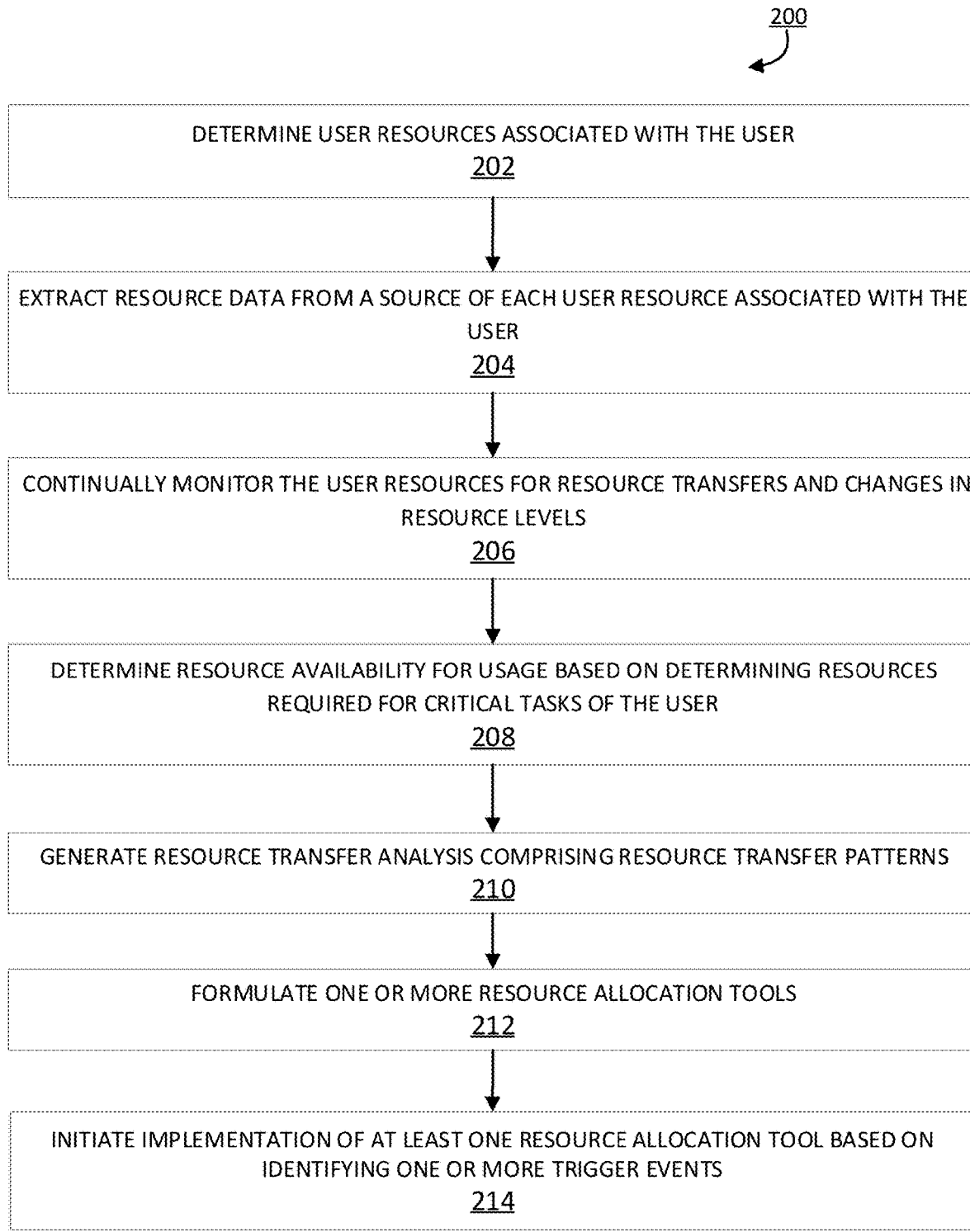
Figure 3:
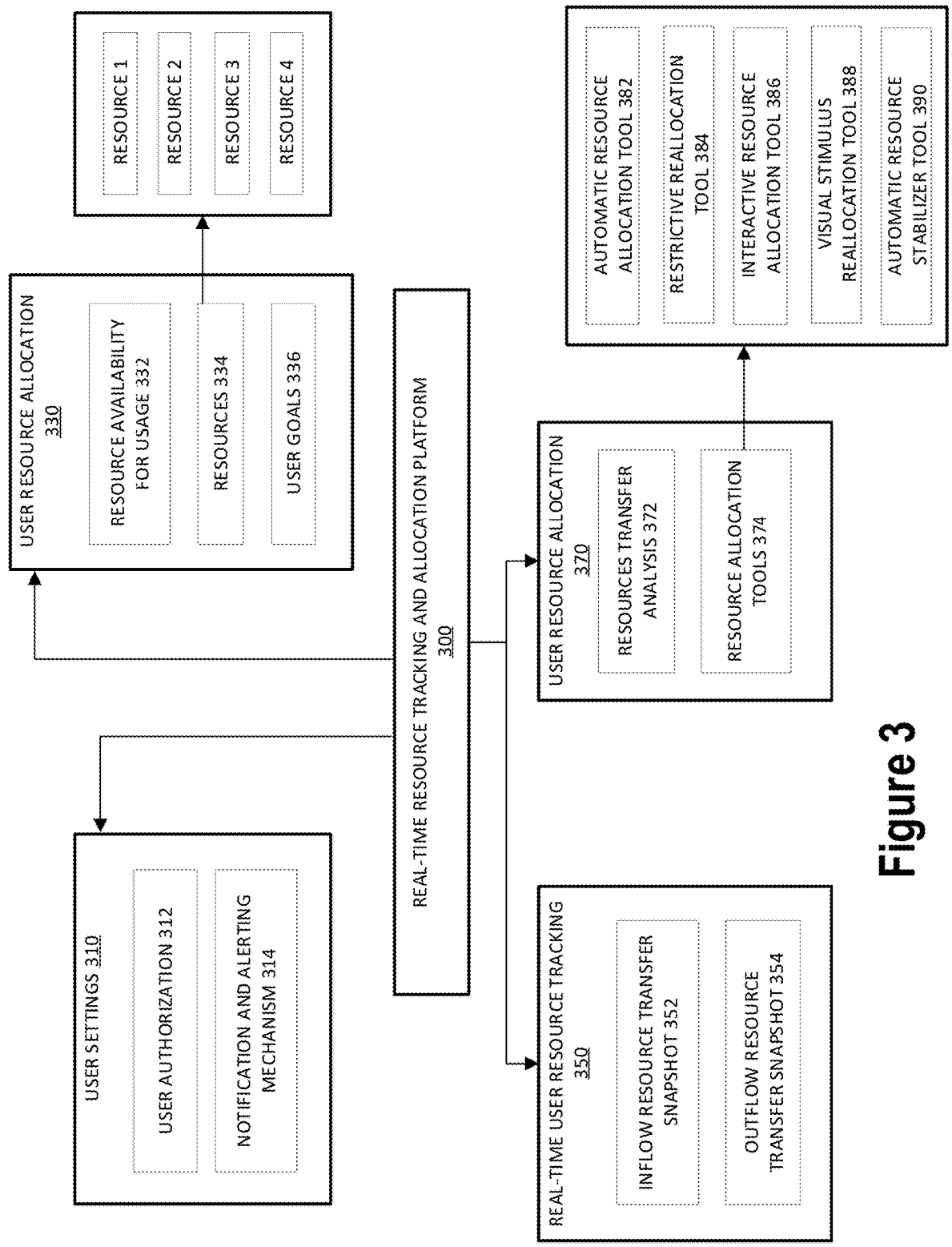
Figure 4:
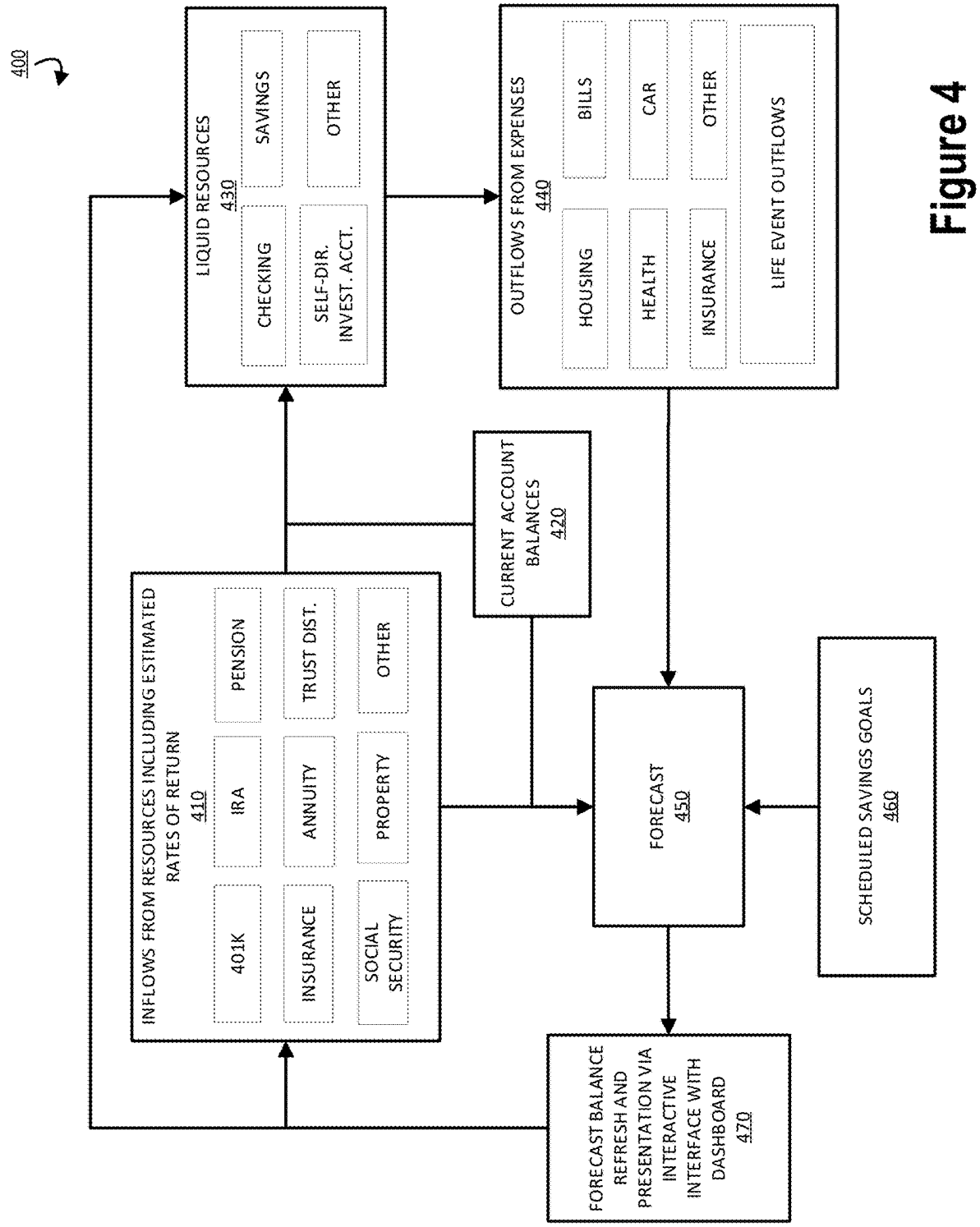
Figure 5:
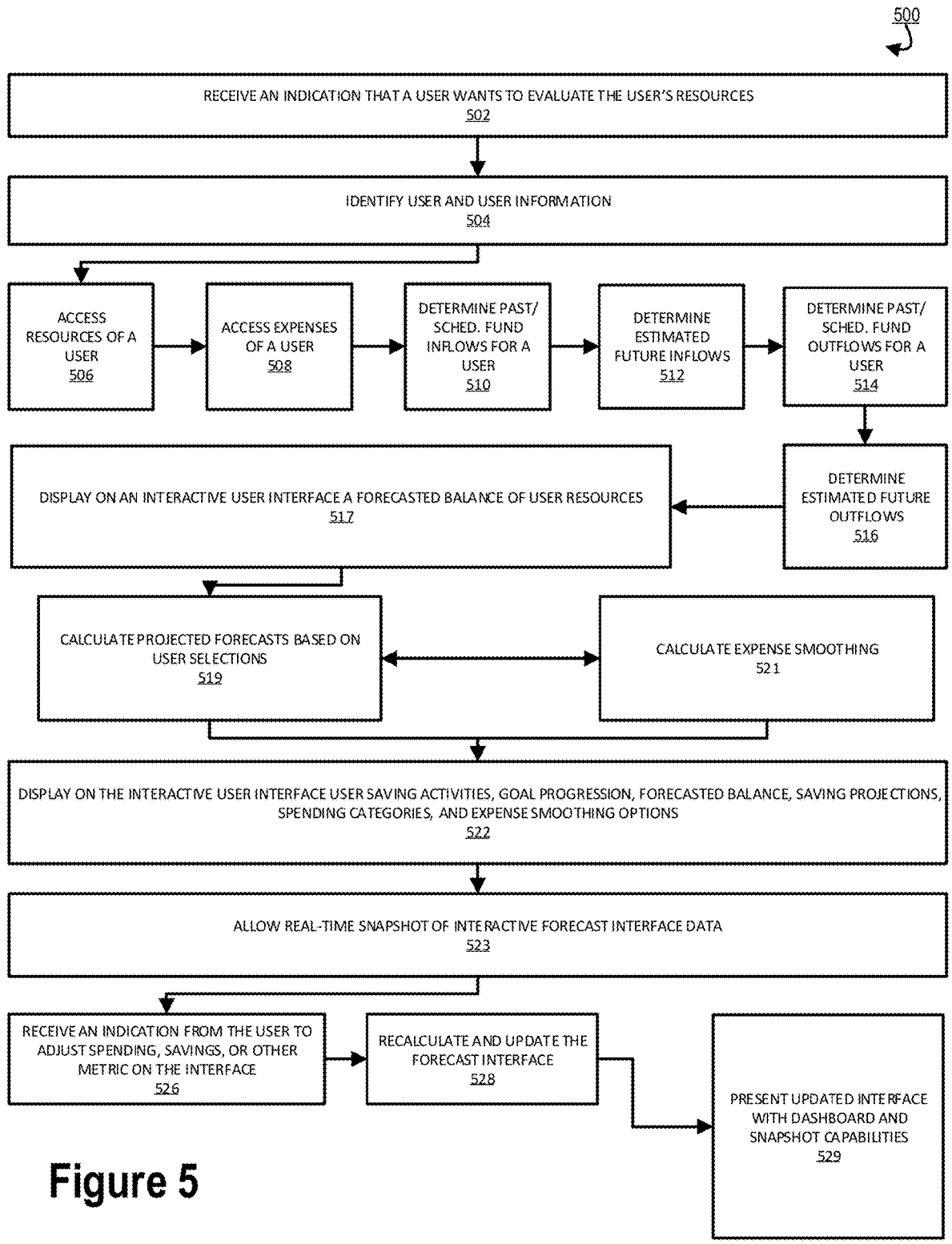

Having thus described embodiments of the invention in general terms, reference will now be made to the accompanying drawings, wherein:

FIG. 1 provides a real-time resource tracking and allocation system environment, in accordance with one embodiment of the present invention;

FIG. 2 provides a high level process flow illustrating real-time resource tracking and allocation, in accordance with one embodiment of the present invention;

FIG. 3 provides a map illustrating aspects of a real-time resource tracking and allocation platform, in accordance with one embodiment of the present invention;

FIG. 4 provides a process map illustrating the real-time determination of resource availability process, in accordance with one embodiment of the present invention; and FIG. 5 provides a process map illustrating the real-time determination of resource availability process, in accordance with one embodiment of the present invention.

Figure 6:
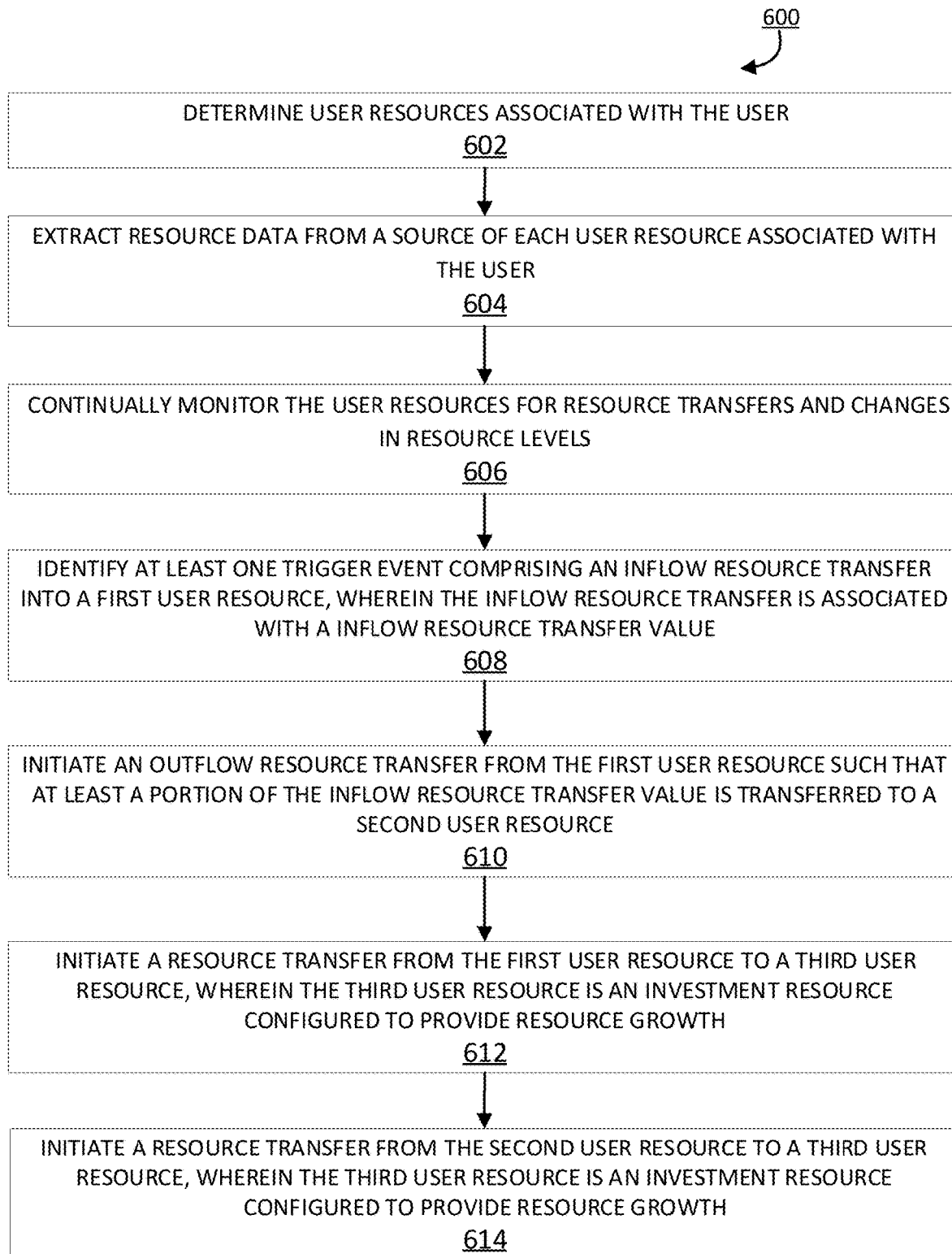
Figure 7:
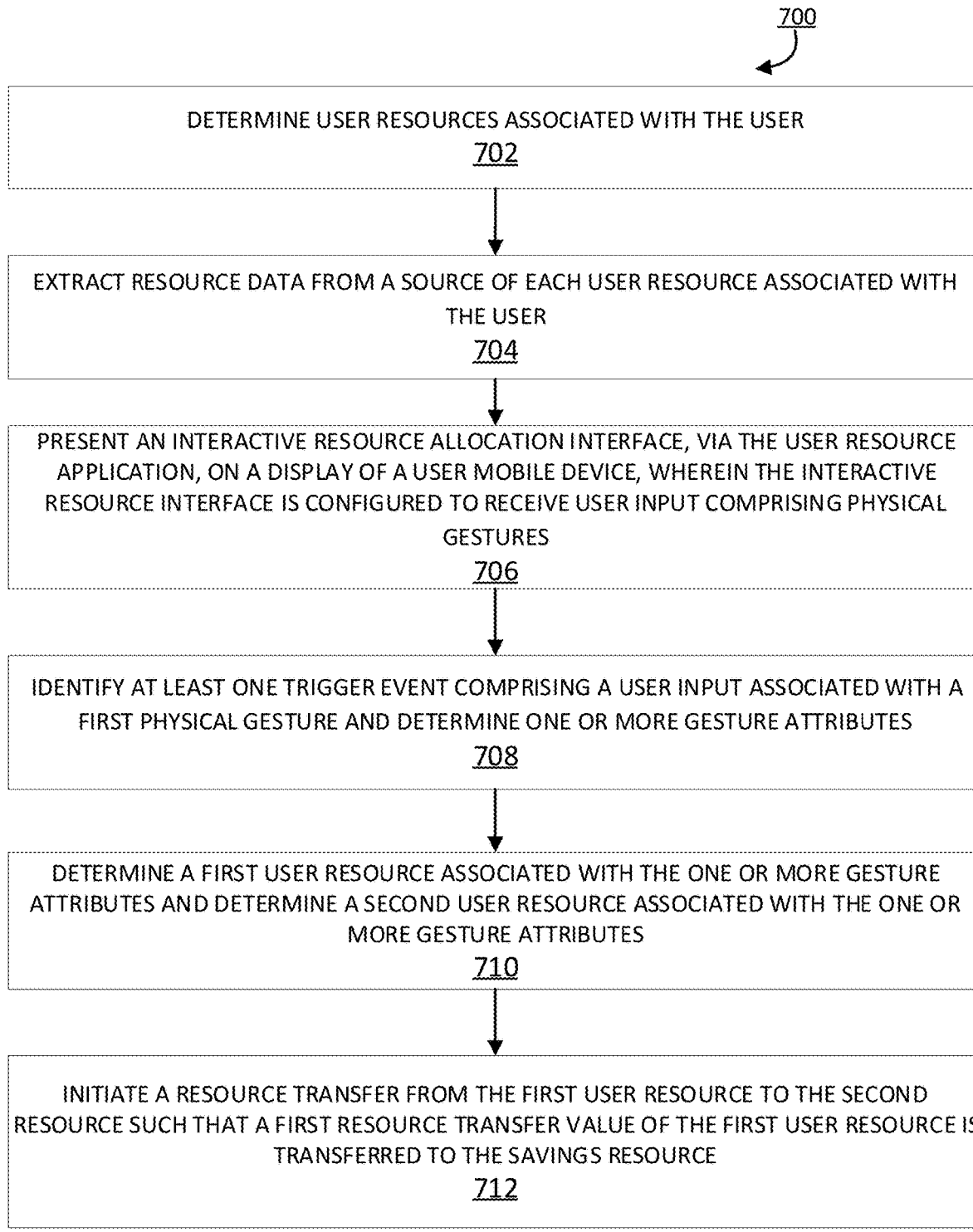

FIG. 6 provides a high level process flow illustrating resource optimization allocation, in accordance with one embodiment of the present invention; and FIG. 7 provides a high level process flow illustrating resource allocation based on available resources, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

"Resources" or "user resources" may include accounts of the user and/or other property owned by the user. An "account" or a "financial account" is the relationship that a user has with an entity, such as a financial institution. Examples of accounts include a checking account, a deposit account, such as a transactional account (e.g., a banking account), a savings account, an investment account, a money market account, a time deposit, a demand deposit, a pre-paid account, a credit account, an account associated with a loyalty program, non-monetary user information, or the like. The account is associated with and/or maintained by the entity. Resources or user resources may also include payment instruments (for example, credit cards and debit cards associated with the user) and negotiable instruments (for example, checks in the form of physical checks or Image Cash letters (ICL) with the user as the payer/payee) associated with the user. The resources may be associated with accounts or may be properties, revenues, and other equity that are not associated with a specific account. Examples of resources associated with accounts may be accounts that have cash or cash equivalents (savings account, checking account and the like), or accounts that are funded with or contain property, such as safety deposits box account for jewelry, a trust account that is funded with property, or the like. Examples of resources that may not be associated with accounts may be antiques in a user's home, jewelry in a user's home, or the like. "Resource level" or "Available Balance/Funds" are resource values, a balance in an account that can be invested, withdrawn or otherwise allocated or the worth of an account. For example, the resource level may refer to the amount available for withdrawal in a checking account/a savings account after posting of current and pending transactions. As another example, the resource level may refer to a bank ledger balance minus the amount of any monetary checks in the process of collection. Resource level may also be referred to as an available balance, a collected balance, good funds, and usable funds.

"Resource transfer" refers to fund inflows and outflows from a particular resource. "Inflow resource transfers" or "inflows" refer to funds received from or deposited into the user's resources (e.g., user's accounts, or the like), such as paychecks, 401K disbursements, pension disbursements, rental property, or the like. Typically, inflow resource transfers comprise influx, earnings or other input into a particular resource that result in increase of a resource level of the resource. "Outflow resource transfers" or "outflows" refer to funds outgoing from the user's resources (e.g., user's accounts, or the like) to cover expenses, such as payments for housing (e.g., rent or mortgage), bills, insurance and other costs, heat, water, food, car, boat, transportation, or like, which illustrates all of the critical or essential (e.g., necessary or semi-necessary to the user) costs that cover what the user currently uses to live. Typically, outflow fund transfers comprise expenses, payments and other disbursements from a particular resource that cause a decrease in the resource level of the resource. A "payment" is a monetary amount or item of monetary value transferred from one individual or entity to another individual or entity in return for receipt of good(s) and/or services.

A "transaction" may refer to any communication between a user and the financial institution or other entity monitoring the user's activities. For example, a transaction may refer to a purchase of goods or services, a return of goods or services, a payment transaction, a credit transaction, or other interaction involving a user's account. In some embodiments, a transaction comprises one or more resource transfers. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "user" may be a financial institution user (e.g., an account holder or a person who has an account (e.g., banking account, credit account, or the like)). In one aspect, a user may be any financial institution user involved in resource monitoring and allocation with the financial institution or any other affiliate entities associated with the financial institution. In some embodiments, the user may be an individual who may be interested in opening an account with the financial institution. In some other embodiments, a user may be any individual who may be interested in resource tracking, monitoring and optimization allocation platform offered by the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, portable multifunction devices, such as laptop computers, tablet computers, mobile phones, smart phones, wearable devices and the like are common. Typically, individuals may have a user device with them when in public. These user devices have the capability to hold large amounts of information, including personal information, resource data (information associated with user resources like banking accounts, payment instruments like credit cards and the like). In other aspects the user devices may enable access to resource data stored at other sources and databases based on requisite authorization. These devices may also be configured to enable the user to perform one or more activities, transactions or resource transfers through an application via online banking, mobile banking, mobile wallets and the like. As such, advancements in technology have facilitated numerous new methods for resource transfer and utilization with user devices. Typically, a user may be associated with multiple resources, the resources being associated with multiple entities, devices and/or systems. Therefore, systems configured for detecting availability of resources at various sources/locations of entities, monitoring resource transfers conducted through multiple devices, ascertaining aggregate impact of resource transfers and configuring resource transfers for critical tasks and goals in a coordinated and integrated manner, are desired. Additionally, a need exists for an integrated platform for presentation, tracking, configuration and optimal allocation of various resources, in real-time or near real-time, to ensure realization of critical tasks and goals and to facilitate resource growth.

Embodiments of the present invention address the above needs and/or achieve other advantages by providing apparatuses (e.g., a system, computer program product and/or other devices) and methods for providing a real-time resource tracking and allocation platform via an interactive interface with incorporated dashboard. In this way, the invention provides various interactive tools and integrated interfaces/dashboards on a mobile device associated with the user. Specifically, the invention provides an integrated platform to enable the user to monitor various resources/accounts associated with multiple entities, monitor current resource levels and balances and track past and current resource transfers, by extracting resource data from various sources/locations associated with the resources and generating a single integrated interface/platform on the user device. The invention may further aggregate and suitably transform the data to determine comprehensive spending trends and saving patterns of the user based on parsing the resource data associated with multiple user resources/accounts. In some embodiments, the system may determine budgets for user based on determining critical activities and goals of the user and additionally enable the user to actively and conscientiously monitor resource transfers/transactions and their global impact on the user resources, goals and budgets. Furthermore, the invention may enable the user to allocate and invest resources appropriately, to increase/grow savings. Typically, the invention provides tools for increased savings that are tailored/configured for each user and that are configured to be easily incorporated into the user's routine. While the system may automatically initiate or promote savings activities in a timely manner in some instances, in other instances the system may also transmit notifications and alerts to the user to remind the user to initiate the savings activities. In this regard, the invention may enable the user to achieve savings at multiple levels. For instance, the system may intimate small transfers to saving accounts based on day to day activities of the user that may be accrued for short term savings goals. As another instance, the system may initiate large transfers to saving accounts based on monthly or quarterly earnings, and/or large transfers between accounts for achieving long term goals (for example, transfers to a retirement account). In other aspects of the invention, the system may safe guard the savings accounts of the user, or other accounts that are earmarked for critical tasks and goals and restrict reallocation of resources or outflows from these accounts.

In some embodiments, the system may determine forecasted balance of resources based on current account balances, scheduled payments, and scheduled savings goals. Once determined, the invention may display the forecasted balance on the application of the user mobile device to enable the user to determine what amount to spend or move to savings, determine the optimal methods and investments for savings growth and provide tools, tips and suggestions for saving and investing. Thus, presenting a holistic resource view on a mobile device in an interactive integrated interface overlaying a displaying screen on the mobile device. The system may provide a day-to-day real-time analysis of accounts to determine on a daily or monthly basis the amount of resources available for use for the user. Furthermore, the system may project savings for the user if the user selects to invest or add to a savings program. The system may also allow for bill payment smoothing by presenting a suggested average monthly payment for a cyclical payment that will account for the lows and peaks of the billing cycle. The system may provide a dashboard where the user can view a snapshot of savings activities and tools like goal, progress, forecasted balance, savings projections, spending categories, links to savings tools, and the like associated with all of the user's resources.

In some embodiments, the system further incorporates a savings tool that aims to achieve steady state expenses each month with respect to a user's resources. If the user underspends or spends less that a predicted budgeted amount for an expense, the system automatically transfers the difference into a separate account. For example, if the user has completed payments for an auto loan, the system may transfer the amount into a savings account to prevent reabsorption into the budget. Alternatively, the system may also achieve steady state resources by diverting any additional inflow/earnings to a savings account. In this way, if the user has large fluctuations in resources, this application would be suitable for steady state resource derivation.

Embodiments of the invention are directed to a system, method, or computer program product for a distributive network system with specialized data feeds associated with the distributive network and specific triggering events associated with the data feeds for coding and overlaying an interface and associated dashboard onto a displaying mobile device. Thus, the system may communicate with, store, and execute code on a mobile device for completion of overlay and presentation of the interface. Furthermore, the system may manipulate and transform currently stored applications on a user device for overlay of the dashboard associated with the interface.

FIG. 1 illustrates a real-time resource tracking and allocation system environment 100, in accordance with one embodiment of the present invention. FIG. 1 provides the system environment 100 with a the distributive network system and specialized data feeds associated with the real-time resource tracking and allocation, configured for overlay of an interactive resource interface and dashboard on a user device, with specific triggering events associated with the data feeds for resource availability manipulation and visualization.

FIG. 1 provides a unique system that includes specialized servers and systems, communicably linked across a distributive network of nodes required to perform the functions of providing real-time resource tracking and optimized allocation. Furthermore, the invention presents a resource interface that may be configured to appear via overlay on a mobile device screen. The resource interface may be overlaid on the mobile device display during an existing user session, such as a web session, texting session, telephone session, gaming session, or the like being conducted on the mobile device. Thus, the interface may displace one or more portions of the existing user session on the display, as such manipulating the physical position of the display elements of the web session, text session, telephone session or the like such that the dashboard may be displayed and visualized as an overlay. In some embodiments, overlaying the resource interface may comprise initiating presentation of one or more resource interfaces or dashboards described throughout this disclosure.

As illustrated in FIG. 1, the resource tracking and allocation system 108 or application server is operatively coupled, via a network 101 to the user system 104, and to the financial institution system 106. In this way, the resource tracking and allocation system 108 can send information to and receive information from the user device 104 and the financial institution system 106 or financial institution server. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the user 102 is an individual that has a user device, such as a mobile phone, tablet, or the like. FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is a computing system that provides authentication for resource viewing and for interaction with and manipulation of the resource interface. The processing device 114 is operatively coupled to the communication device 112 and the memory device 116. The processing device 114 uses the communication device 112 to communicate with the network 101 and other devices on the network 101, such as, but not limited to the financial institution system 106 and the resource tracking and allocation system 108. As such, the communication device 112 generally comprises a modem, server, or other device for communicating with other devices on the network 101.

The user device 104 comprises computer-readable instructions 120 and data storage 118 stored in the memory device 116, which in one embodiment includes the computer-readable instructions 120 of a user resource application 122. The user resource application 122 may also be referred to as a user resource tracking and allocation application. In some embodiments, the user resource application 122 is a comprehensive integrated platform for identification, monitoring and optimal allocation of resources associated with the user. In some embodiments user device 104 may refer to multiple user devices that may be configured to communicate with the resource tracking and allocation system and/or the financial institution system via the network 101. The user resource application 122 may be a standalone application configured for real-time resource tracking and allocation or the user resource application 122 may refer to one or more existing applications on the user device. In some embodiments the resource tracking and allocation system 108 and/or the financial institution system may transmit control signals to the user device, configured to cause the user resource application 122 to perform one or more functions or steps associated with resource tracking and allocation.

In some embodiments, the user resource application 122 allows a user 102 to provide authentication for resource viewing and for interaction with and manipulation of the resource interface via the user device 104. In some embodiments, the user resource application 122 allows the user to sign onto or authenticate into the resource interface. In this way, the user resource application 122 may allow the user access to the interactive resource interface via authentication. Authentication into the interface may require at least one authentication into one or more of the resources. In this way, if a user has a checking account, the user resource application 122 may accept authentication into the checking account as an acceptable authentication into the resource interface. The user resource application 122 based on communication from the resource tracking and allocation system 108 may randomly require the user to authenticate into the resource interface by requesting a random resource account authentication credential to access the interface. In some embodiments, based on the received authentication credentials and requisite authorization, the resource tracking and allocation system 108 may extract resource data associated with user resources from various sources (for example, memory device 140 of the financial institution system 106, memory device 116 of one or more user devices 104, and the like) and present the extracted, parsed data on the resource interface.

As further illustrated in FIG. 1, the resource tracking and allocation system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the financial institution system 106 and the user system 104. As such, the communication device 146 generally comprises a modem, server, or other device for communicating with other devices on the network 101.

As further illustrated in FIG. 1, the resource tracking and allocation system 108 comprises computer-readable instructions 154 stored in the memory device 150, which in one embodiment includes the computer-readable instructions 154 of a resource application 158. In some embodiments, the memory device 150 includes data storage 152 for storing data related to the system environment, but not limited to data created and/or used by the resource application 158. In some embodiments, the resource application 158 provides a comprehensive integrated platform for identification, monitoring and optimal allocation of resources associated with a user.

In the embodiment illustrated in FIG. 1 and described throughout much of this specification, the resource application 158 may determine resource balances, resource schedules, and resource savings goals, generate/display the interactive resource interface, present the interactive resource interface, allow monitoring of the resources on the interface, enable allocation of resources, receive user input, transmit user notifications and enable implementation of savings tools. In some embodiments, the resource application 158 may determine resource balances, resource schedules, and resource savings goals. In this way, the resource application 158 may communicate with the financial institution system 106, the user device 104, merchant systems and other third party systems to identify resources the user may have. Furthermore, the resource application 158 may contact merchants to identify scheduled recurring payments that the user may have with one or more merchants, individuals, or the like.

In some embodiments, the resource application 158 may generate and display on the interactive resource interface. The resource application 158 may display a forecast of the determine balances, schedules, and goals via an interactive interface that includes a selectable dashboard. The display is presented, in some embodiments, as an overlay over an already displaying mobile device display. Furthermore, the resource application 158 may parse out the resources including the monthly expenses of a user for a granular view of the individual resources of the user. In this way, the resource application 158 may parse out the identified resources and monthly expenses to a granular level, such that the date, time, product/service, amount, and merchant for each resource identified is revealed. In this way, the system may utilize and compile data received from the user, financial institution system 106, and merchants or vendors in order to identify the date, time, product/service, amount, and merchant for each identified resource and triggered cyclic expense.

In some embodiments, the resource application 158 may provide facilitate real-time resource tracking and allocation. In some embodiments, the resource application 158 computer readable instructions 154 or computer-readable program code, the when executed by the processing device 148, causes the processing device to perform one or more steps involved in resource tracking and allocation and/or transmit control instructions to other systems and devices to cause the systems and devices to perform specific tasks. In this way, the resource application 158 may determine user resources associated with the user, based on extracting pertinent information from the data storage 152, the user device 104, the financial institution system 106 and other external and third-party systems. In this regard, the resource tracking and allocation system 108 may be configured to establish communication links with the user device 104, the financial institution system 106 and other external and third-party systems, in order to retrieve resource data from memory or data storage devices associated with these systems. Since the user's resources may be associated with multiple entities and stored in different locations, the resource application may extract or retrieve resource data from the individual storage locations/sources of each of the resources. The resource application 158 may continually monitor the user resources for resource transfers and changes in resource levels. Furthermore, the resource application 158 may determine resource availability for usage based on determining resources required for critical tasks of the user. The resource application 158 may then generate resource transfer analysis comprising resource transfer patterns. Based on this comprehensive analysis and continual monitoring of the user's resources and resource transfers associated with these resources, the resource application 158 may formulate one or more resource allocation tools specific to the user. The system may further initiate the implementation of the resource allocation tools based on identifying one or more trigger events.

As illustrated in FIG. 1, the financial institution system 106 is connected to the resource tracking and allocation system 108 and is associated with a financial institution network. In this way, while only one financial institution system 106 is illustrated in FIG. 1, it is understood that multiple network systems may make up the system environment 100. The financial institution system 106 generally comprises a communication device 136, a processing device 138, and a memory device 140. The financial institution system 106 comprises computer-readable instructions 142 stored in the memory device 140, which in one embodiment includes the computer-readable instructions 142 of an institution application 144. The financial institution system 106 may communicate with the resource tracking and allocation system 108 to provide authentication credentials for resources and provide resource status information. While the resource tracking and allocation system 108 may communicate with the financial institution system 106 via a secure connection 160 generated for secure encrypted communications between the two systems for manipulating and transferring funds to one or more different resources. In some embodiments, the secure connection 160 may be an operative communication link/channel established via the network 101.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a high level process flow illustrating the real-time resource tracking and allocation process 200, in accordance with one embodiment of the present invention. The various steps described with respect to the process flow 200 and other process flows presented in this disclosure may be carried out by a "system" comprising one or more of the resource tracking and allocation system 108, the financial institution system 106 and the user device 104. In some embodiments, the system may comprise the resource tracking and allocation system 108 configured to perform one or more steps described herein, while in other embodiments the resource tracking and allocation system 108 may transmit control signals that cause the financial institution system 106 and/or the user device 104 to perform some or all of the steps.

As illustrated in block 202, the process 200 is initiated by determining resources associated with the user. In some embodiments, the system initiates determining the user resources based on receiving an indication that the user wishes to evaluate the user's resources. In this regard, the system may establish an operative communication link with a mobile device associated with a user. Although referred to as the mobile device, it is understood that any suitable user device, or a combination of devices, may be used in lieu of the mobile device to perform one or more steps herein. The user may transmit an indication seeking evaluation of user resources, via the mobile device, other user devices, transaction terminals, ATMs and the like, by interacting with one or more stored applications on the device, by phone, by email or by any other suitable means. In some embodiments, the user may choose one or more user devices for installation of a resource application configured for continued monitoring of the user resources. As such, the user may be associated with one or more user devices comprising computing devices like laptop computers, desktop computers, personal digital assistants, mobile devices like smart phones, tablets, cellular phones, other electronic devices like smart TVs, gaming consoles, voice command devices and wearable devices like smart watches, glasses, fitness devices, and the like. In some embodiments, the mobile device may be coupled to one or more secondary user devices comprising speakers, display screens, cameras, microphones, fingerprint scanners, voice recognition systems/voice command devices, head phones, alarm and notification devices, lighting devices, keyboards, tactile sensors or preceptors, location and movement determining devices like global positioning systems, accelerometers, and the like, while in other embodiments, the secondary user devices are built into or are integral with the primary user devices.

In some embodiments establishing the operative communication link/channel with the mobile device may comprise providing a resource tracking and allocation interface or a user interface on the mobile device. In some embodiments, the system may transmit and store at least a portion of a user resource tracking and allocation application, also referred to as a "user resource application," on the mobile device, via the operative communication link. In some embodiments, the user resource application may be stored entirely on a data storage associated with the mobile device, or any of the user devices. In some embodiments, at least a portion of the user resource application may reside on the user device, in a connected user device, an external system, a third party system and/or any other external system and may be accessible to the user device via a network. The user resource application may be an application, a widget, a computer program product or software configured to perform one or more steps of the process flows described herein, provide a resource tracking and allocation interface, provide other audio-visual interfaces, notify and alert the user, facilitate accessing/allocating one or more resources of the user, create/present visual representations of resources and resource transfers, modify functioning of one or more applications or display of the mobile device and turn the device on and off, either automatically or in response to receiving control signals from the system via the operative communication link. In other embodiments, the system may transmit control signals to the user device that cause one or more existing applications, pre-installed applications, browser applications or the device's operating system to perform one or more steps of real-time resource tracking and allocation, based on receiving appropriate authorization from the user. In some embodiments, the system provides the user resource application comprising an intelligent personal assistant and knowledge navigator to enable the user to effectively navigate the interface with ease using audio commands, tactile commands and/or gestures.

In some embodiments, the system may access the mobile device and/or other user devices, based on receiving the requisite authorization from the user, to determine user application information associated with the user. The user application information may comprise one or more applications and widgets stored on the user device, information regarding the entities associated with the application (application owner/provider, type of authentication required, and the like), location of storage of the applications/widgets, application content information, authentication requirements, usage patterns and frequency of use, information regarding the type of device and device identifiers (for example, unique device identifiers), and the like. In some embodiments, the user application information may also comprise user information, transaction/activity history, location information, contact information and the link retrieved from external systems comprising financial institution systems, merchant systems and other third party systems. The system may retrieve associated user application information based on establishing operative communication channels with the external systems, either directly or via the first user device. In this regard, the system may seek authentication credentials from the user that are required to access and/or retrieve application information from the external systems.

Based on analyzing the user application information, the system may determine that the user is associated with one or more user resources. In this regard, the system may analyze application information concerning the user and determine that the user is associated with one or more user resources and also determine resource information comprising the entities/institutions associated with the resources, resource identifiers and the like. For example, the system may analyze application information associated with a financial institution application, a banking application or a mobile payment/social expense sharing application of the mobile device and determine that the user is associated with a first user resource comprising a checking/transactional account associated with a first entity/financial institution. Alternatively, or in addition with the above, the system may analyze user application information associated with browser applications, merchant applications and the like, comprising stored payment credential information, information associated with auto fill forms, designated payment credentials for the merchant and the like to identify the transactional account associated with the user and/or to gain additional information associated with the previously identified account. As another example the system may analyze application information associated with a merchant application and determine that the user utilized a second user resource, comprising a payment instrument (for example, a credit card) associated with a second entity, to conduct one or more transactions. In this regard, the system may analyze the payment instrument identifier's format in conjunction with the time of the transactions, merchant location, location of the user at the time of the transaction, authentication type (passcode, PIN associated with the credential, user fingerprint scan, reading the chip card associated with the credential and the like) and type of transaction (online or in-store) to determine, if the previously determined payment credential is associated with a physical card used or a token/payment identifier associated with a digital wallet of the mobile device or other user devices. Alternatively, the system may analyze the user application information associated with a digital wallet application to determine the second user resource comprising the payment instrument associates with the second entity.

As another example, the system may retrieve application information comprising user emails or messages and parse the contents to determine that the user has received an inflow resource transfer comprising a deposit to one or more user resources. The system may further analyze the email contents and structure to identify an attachment comprising an image of a check or an Image Cash Letter with the user as the payee. In this regard, the system may convert the unstructured data of the email content/attachment to a structured format, for example an Open Financial Exchange (OFX) format. Furthermore, the system may perform Magnetic Ink Character Recognition (MICR) scans, Optical Character recognition scans and/or barcode scans to determine resource transfer amount, transfer date, entity information, entity logos, glyphs and other marks, account numbers, control indicators, barcodes and the like. In this regard, the resource transfer may be received from an insurance provider or from a merchant in response to product returns, and the system may designate the Image Cash Letter as a one-time third user resource, in that, the third user resource subsists till a predetermined future time when the resource transfer to another user resource is complete or the when the resource transfer is posted. After the predetermined future time, the system may exclude the one-time resource from future consideration for resource allocation, budgeting and the like. Instead, as another illustration, the Image Cash Letters may be the user's monthly or fortnightly paychecks from an employer and the system may determine the third user resource comprising the recurring paychecks to be a fixed resource. Here, the system may identify a pattern deposits of paychecks and consider an average amount of inflow resource transfers for resource allocation and budgeting. In other embodiments, the system may designate the Image Cash Letters as a resource transfer or as a medium for resource transfer and the deposit account as the user resource. Similarly, the system may determine one or more outflow resource transfers, and user resources associated with the resource transfers, comprising payments based on scanning check images uploaded by the user. As another non-limiting example, the system may analyze user application information associated with a merchant and determine that the user is associated with a fourth resource comprising loyalty points that can be redeemed for products or services.

The system may initiate a display of the determined one or more resources and the associated entity information, resource information and the like on the resource tracking and allocation interface of the user resource application. The system may enable the user to choose/select one or more resources that the user wishes to include for further consideration and analysis. In some embodiments, the system may enable the use to provide one or more resources not determined by the system and/or augment/modify information associated with resources previously determined by the system. In this regard, the user may provide resource identifiers like account numbers, routing numbers, entity information, resource type, storage location and the like. Therefore, the one or more determined user resources may comprise resources determined by the system, resources selected by the user from the displayed list and/or resources specified/provided by the user.

Next, as illustrated in block 204, the process 200 continues by extracting resource data from a source of each user resource associated with the user, wherein resource data comprises real-time resource level, resource transfer history, resource transfer schedules and user goals for each user resource. As discussed previously, the user may be associated with one or more resources, the resources being associated with one or more entities. Each of the resources may be associated with resource data comprising resource identifiers, account numbers, entity identifiers or identification numbers, routing transit numbers, transaction/activity history, current and previous resource levels, user preferences, resource characteristic information (financial instrument type, currency information, and the like), current and previous resource allocations and transfers, payment instruments associated with the accounts and the like. "Resource level" or "Available Balance/Funds" are resource values, a balance in an account that can be invested, withdrawn or otherwise allocated or the worth of an account. For example, the resource level may refer to the amount available for withdrawal in a checking account/savings account after posting of current and pending transactions. Resource levels may indicate the current values of the resources that may be determined in real-time or near real time, either when the user initiates a session or periodically to ascertain current/updated values. Resource transfer history of a resource may comprise, resource transfers in the past (inflows and outflows, dates/times, resource transfer values/amounts involved, resource level after each transfer, one or more resources/entities/users involved), pending resource transfers and the like. Resource transfer schedules may comprise, scheduled inflow resource transfers, scheduled outflow resource transfers, associated resource transfer values, expected resource levels after the transfers, date/time that the transfers are expected to be initiated/posted and the like. User goals with respect to a resource may comprise, resource value allocations by the user, expected/optimum resource growth or returns, time period associated with the goal, target resource level, purpose of the goal and the like. For example, the user may have an education savings goal associated with a transactional account involving transfer of a predetermined resource value/amount from the transactional account to an education savings account every week to achieve a target resource value at the educational savings account within a pre-determined time period.

Furthermore, the resource data for each of the resources may be stored at different sources of resources, either entirely or in part. The "sources" of resources may refer to storage locations associated with different entities related to the resources, storage locations associated external or third party systems, storage locations associated with various user devices, cloud storage systems and the like. In some embodiments, each storage location may have a specific structure, encryption or file format associated with the stored resource data. In some embodiments, the system may analyze the user application information, in conjunction with information retrieved from other external systems to determine the sources of each of the resources. The system may further determine the best means for accessing the sources, retrieving resource data and the authentication/authorization requirements. The means for accessing the sources based on receiving requisite authentication/authorization credentials from the user, may comprise accessing the resources via applications on the user device by transmitting control instructions to the applications to retrieve the resource data, transmitting requests for resource data directly to the entity systems associated with the resources, receiving resource data from the user, parsing account statements and other documents of the user and the like. In some embodiments, the user may specify the type of resource data to be extracted/retrieved (for example, account numbers, a first time period of transaction/activity history to be considered, specific type of resource transfers to be considered and the like).

As an illustration of step 204 and continuing with the previous examples, the user may be associated with the first user resource comprising a checking/transactional account associated with a first entity/financial institution, the second user resource comprising the payment instrument (for example, a credit card) associated with a second entity and the third user resource comprising an Image Cash Letter or check with the user as the payee. Furthermore, at least a portion the resource data associated with the first user resource/transactional account of the user may be stored at an account database associated with the first entity in an Open Financial Exchange (OFX) format or another searchable and retrievable format with appropriate security features, requiring an account number/PIN authentication. The second user resource may be a credit card associated with a digital wallet application of a second entity. In this regard, at least a portion of the resource data associated with the second user resource may be stored on a Subscriber Identity Module (SIM) card, a chip card, a secure element or a memory location associated with the user mobile device in an encrypted format, requiring a fingerprint authentication for retrieval of resource data and accessing the dynamic security code generator key for future authentication. Similarly, the third user resource comprising the image cash letter/image of the check may be received as an attachment to an e-mail and may be stored in a database associated with the e-mail service provider or a another storage location in a MIX, Maildir or mbox format, requiring the username/password authentication or prior authentication in associated applications.

The system may initiate a display of the determined one or more resources and the associated sources, authentication/authorization information, entity information and the like on the resource tracking and allocation interface of the user resource application. The user may then provide, via the operative communication link, the requisite authentication credentials or authorization for the system to access the user resources and retrieve resource data from the source of the resources. The system may then store these received credentials in a specific location. In some instances, the system may be authorized to retrieve resource data based on providing the authentication credentials received from the user to an entity system, to an application associated with the resource or the source of the user resource. In other instances, the user may pre-authorize the system with the entities associated with the resources by modifying user information, access information, device information and the like, such that the system may retrieve the requisite resource data with or without providing the authentication credentials, or with lower authentication requirements. In this regard, it is noted that authentication credentials may include, may include, but are not limited to, one or more of a username, contact information, a password, a PIN number, biometric information (for example, biometric features such as fingerprints, finger vein and palm vein patterns, as well as iris and facial recognition to verify individual identities), a unique identification number associated with the user, dynamic security codes, social network information, an account number, a card number, usage patterns associated with the user devices, physical parameters (for example heart rate, number of steps), location of the user and/or the user devices and the like.

In response to extracting the resource data, the system may transform the extracted resource data into a textual format encrypted for use only on the resource tracking and allocation interface. In this regard, the system may transform the extracted data into a suitable file format, encode/encrypt the data/files in such a way that the plaintext is available only to the authorized system with a specific decryption key. In some embodiments, the system may generate a specific pseudo-random encryption key for each user device with the user resource application and encode the data using the specific encryption scheme. The system may then transmit an associated decryption key to the specific user device, such that only the user resource application on the specific user device is configured to employ the decryption scheme to decode the resource data for presentation on the user interface and to employ the resource data in various resource allocation steps. Resource data often includes financial and personal information of the user and hence security of the data is paramount. The novel method described above provides increased security for the resource data, in that only the specific user resource application with the requisite authentication is granted access to the data. The encoded resource data, the encryption and decryption keys may be stored in appropriate memory locations. In some embodiments, the system may store at least a portion of the resource data on a database associated with a secure memory location associated with the resource tracking and allocation system and/or the user device. In some embodiments, the system may store the resource data with a database associated with the resource tracking and allocation system for increased security of data and ease of updating/modifying the data, while in other embodiments, or in combination with the previous embodiments, the system may initiate storing of the resource data at the user mobile device for faster retrieval and allocation. For example, the system may store the current resource levels on the user mobile device for ease of retrieval and presentation, based on determining that the user views the resource levels most frequently. The system may further retrieve the resource transfer history stored at an external secure database, when required, for presentation on the resource interface.

As discussed previously, the resource data extracted from the sources may be in unstructured formats, different file formats, in image files, previously encrypted files and the like. The system may convert data extracted from the sources into a uniform structured format by decoding, converting or otherwise transforming the resource data. In this way, the data may be transformed into a textual format encrypted for security use for only real-time determination of resource availability resource interfaces and dashboards. Once the data is removed from the interfaces or dashboards, the system encryption may prevent the data from being readable in any other medium or by any other application/device.

Typically, in order to access the interactive resource interfaces of the user resource application, the user may be required to authenticate, via the operative communication link. In some embodiments, authentication into the interface may require at least one authentication into one or more of the resources. In this way, if a user has a checking account, the system may require authentication into the checking account in order to open the interactive resource interface to visualize all resources associated with the user. While in other embodiments, the system may randomly require the user to authenticate into the resource interface by requesting a random resource account authentication credential to access the interface. In this way, the user may have a different username, password, or alternative credential to access each account associated with a user resource. In this way, the user may have Password 1 for a checking account, Username 2 and Password 2 for accessing a savings account, Username 1 and Password 3 for accessing a loan account, or the like. As such, the system may store each of these various authentication credentials, user them to retrieve resource data and require the user to provide one of those credentials in order to visualize the interface. In some embodiments, the system may enable the user to set up a specific authentication for enabling the user to access and/or modify one or more aspects of the resource interface. For example, the system may enable the user to access the resource interface based on ascertaining that the user is currently authenticated on a linked user device or currently adorning a pre-authenticated wearable device that monitors physical parameters of the user. The system may then enable the user to modify the resource interface or perform resource transfers/allocations based on receiving specific passcodes, fingerprint/voice recognition or one or more authentication credentials associated with the user resources.

As illustrated on block 206, the process 200 further comprises continually monitoring the user resources for resource transfers and changes in resource levels. In this regard, the system may initiate a resource tracking mechanism, wherein the resource tracking mechanism is configured to continually monitor the user resources for resource transfers and changes in resource levels, in real-time. Resource tracking typically involves determining, for each user resource, inflow resource transfers, outflow resource transfers and changes in resource levels. Resource transfers typically involve at least two resources (for example between a first user resource and a second entity resource), albeit, in this instance, at least one of the two resources may be associated with the user. Inflow resource transfers to a user resource are activities and transactions that add value to the user resource and cause an increase in resource levels, for example, deposits, interest gains, investment returns, increase in value due to currency fluctuation, appreciation and other income associated with the user resource. Outflow resource transfers from a user resource are activities and transactions that reduce the value of the resource and cause a decrease in the resource levels, for example, payments, disbursements, transfers to another resource, depreciation of the resource, reduction in value due to currency fluctuations and other external factors and the like. Although described in the context of resource transfers between at least two resources, it is understood that resource levels may vary within a particular resource, for example due to appreciation, amortization and the like.

As such, the system may build off of previously identified resource levels to continually monitor for initiated, upcoming and/or posted resource transfers to and from the user resources and the changes in resource levels. In some embodiments, the system may continually monitor the user resources based on real time or near-real time retrieval of resource data from the sources and analysis of the same (account information, transaction history, payment confirmation statements received from merchants, and the like). In this regard, the system may retrieve the resource data and/or update the resource levels intermittently, either periodically or at random intervals of time. For example, the system may monitor the sources of the resources for new resource transfers that may have been initiated or that are pending/posted, monitor the status changes, determine resource values/amounts involved and determine updated resource levels by considering each of the resource transfers, in real-time. In some embodiments, at every event of determining a new resource transfer, the system may initiate transmission of alerts/notifications to the mobile device of the user indicating the resource transfer, new/current resource level, previous resource level, status of the transfer and the like. In some embodiments, transmitting alerts may comprise transmitting control instructions that cause the user resource application to present the appropriate content/interfaces. For example, the user resource application may be running in the background on the mobile device, and the transmitted instructions may cause the user resource application to present a resource transfer interface on a display associated with the mobile device to alert the user and may cause the mobile device to further present auditory and/or vibratory alerts. In other instances, the system may determine that the mobile device is offline and may then transmit alerts (via text messages, near field communication or other suitable means) that are configured to cause the mobile device to connect to a suitable network, Wi-Fi, internet and the like. The resource transfer interface may comprise visual representation of the resource transfer, new/current resource levels, previous resource levels, status of the transfer, images of the users/resources/entities involved in the transfer and associated text. In some embodiments, the transmitted signals may cause alerts to be presented via auxiliary/secondary user devices connected to the mobile device, for example, by modifying the illumination of lighting devices, modifying the sound volume/content of speaker devices, and the like to obtain the user's attention.

In some embodiments, the interfaces of the user resource application, for example the resource transfer interface, may be overlaid on the displays/interfaces of one or more applications or user interface sessions, that the user is currently viewing on the display of the user device. In some embodiments, the overlay of the interface may comprise presenting the resource transfer interface in a new window, pop-up window or via another suitable graphical control element. The resource transfer interface may comprise links, references and functionalities that enable the user to navigate between different pages/windows/dashboards of the interfaces presented by the user resource application. In some embodiments, the overlay of the interface may comprise presenting the resource transfer interface overlapping/placed on the existing display such that the resource transfer interface covers/obstructs at least a portion of the existing display visually. In this regard, the system may lock the functionality associated with the existing display in some embodiments, while in other embodiments, the functionality might be allowed to remain active. In other instances, the resource transfer interface may be superimposed on the existing display such that the both the existing display and the overlaid interface are visible and/or discernable. In some embodiments, this may be achieved by modifying the transparency of the overlaid interface, providing a split screen view with both the display and the interface, modifying the area of the display by zooming in/out and the like. In some embodiments the system may analyze the existing display and determine first portions of the display that comprise content, functionality (action buttons, scroll bars, checklists and the like) that may be required/utilized by the user and second portions of the display that may comprise background images, areas without content and the like that may not be required/used. The system may then present a new display by moving the first portions of the existing display to accommodate the resource transfer interface, such that both the first portions and the resource interface are visible.

In some embodiments, the resource transfer interface may comprise security features. For instance, the overlaid interface may lock the display of the mobile device, disable other functionality until the user confirms the legitimacy of the resource transfer. In the user indicates that the resource transfer is unauthorized/misrepresented, the system may flag the resource transfer as problematic or potentially unauthorized. In this regard, the system may automatically undertake corrective action comprising providing additional information associated with the flagged transfer for the user's consideration, transmitting an indication of the flagged unauthorized transfers to the associated entities, transmitting instructions to halt the processing of the flagged resource transfers, initiate a session with entity representative via phone, email and the like. Therefore, potential unauthorized transactions are resolved instantaneously. Although described with respect to the resource transfer interface, other interfaces/dashboards presented by the user resource application may be similar in function and content with respect to the resource transfer interface.

In other instances, the system may only determine the current resource levels when the user activates the user resource application. For example, prior to the activation of the user resource application and/or initiation of a resource tracking and allocation session at a second instance of time, a particular user resource may have a first resource level determined at a first instance of time. The system may determine that between the first and second instances of time, the said user resource was associated with two or more resource transfers. The system may determine addition/depletion of values due to each resource transfer and aggregate them. The system may further determine that the said resource comprises a virtual currency, and may determine a current second resource level, in real-time, based on the aggregated resource transfers, in conjunction with the most current value of the virtual currency obtained from an external system. The system may initiate the presentation of a resource transfer interface that may be substantially similar to the embodiments described above.

Next, as illustrated in block 208, the system may further determine resource availability for usage based on determining resources required for critical tasks of the user. Critical tasks may refer to customary, periodic allocations/resource transfers of the user, scheduled resource transfers, current expenses and payments and the like. Critical tasks of the user may comprise resources/resource values required for day to day expenses of the user (rent, food, transportation and the like), resources allocated for user goals/savings (health savings account, retirement savings and the like), resources for payments (utilities, insurance, credit card payments, loan payments and the like) and/or allocations for related users (spouse, children, parents and the like). In some embodiments, the user may specify the critical tasks. The system may determine the resource levels available or likely to be available to the user at a particular instance of time or an allocation time period, either currently or in the future. The system may enable the user to specify the allocation time period comprising days, weeks, months or an indefinite amount of time. In this regard, the system may determine, for each user resource, the available resources values and expected inflow resource transfers that may be transferred or otherwise utilized at the instance of time or within the allocation time period. The system may then determine, for each user resource, resource values/amount required for critical tasks, for the allocation time period, and hence determine the resource values/amounts available for other allocations after deducting the outflows for critical tasks. The resource availability for each user resource may be positive, negative or neutral. The system may then aggregate the resource amounts available for each resource and determine a total, net value of resources available for the user. For example, the user may seek to view the resource value/amount that he/she can spend for other non-critical activities for a particular week. The system may then determine the resource levels of user resources for the week and the resources values required for critical tasks for the particular week. The system may then initiate a display of the net resource availability for usage and also a display of resource availability of individual user resources for the particular week and also projections for the subsequent weeks.

For example, based on analysis of historical resource transfers, the system may determine that the user initiates a payment of a first predetermined amount towards retirement planning from a transactional account every week. The system may identify that retirement planning is a critical task and designate the first predetermined amount in the transactional account for retirement planning, if not already paid in the current week either from the transactional account or another user resource. As another example, the system may identify monthly payments for utilities as critical tasks from a payment instrument with a certain resource level and retrieve the associated resource transfers for the past years. The system may identify that the resource values or payments associated for certain months (for example, winter months) are higher than others (for example, in spring). In this regard, the system may designate an average amount as the resource value for the critical task or alternatively assign an optimum amount, based on the current month, which will be deducted from the resource level when the payment is made. As another example, the system may identify a prior payment at a restaurant during the user's vacation, determine that the task is not critical since the user is unlikely to travel to the same restaurant in the allocation period and that the payment amount is likely available for usage in the current allocation period. Therefore, the system may determine for each user resource a first resource level and requirements for critical tasks within an allocation time period, wherein the critical tasks are one or more tasks of a plurality of activities/transfers associated with the user. The system may then determine individual resource availability for each resource based on the first resource level and resource values for critical tasks. The system may then aggregated the individual resource availabilities to arrive at the net resources available for usage.

Therefore, the process 200 continues by generating resource transfer analysis comprising resource transfer patterns based on monitoring for depletion of resources and resource transfers to identify a plurality current inflow/outflow resource transfers of the user at block 210. As such, the system may build off of previously identified resources required for critical tasks to continually monitor for current expenses associated with the same task, entity/vendor or cycle/time period. As such, the system may continually identify new expenses, new resource transfers/payments associated with the previously identified cyclical expenses and track the resource value of each new expense and the means (preferred resource for payment, online/in-person payment, date/time associated with the transfer and the like) in which the user pays for the expense. To monitor is to watch, observe, or check something for a special purpose over a period of time. The "monitoring" may occur periodically over the period of time, or the monitoring may occur continuously over the period of time. In some embodiments, a system may actively monitor the sources and associated resource data, wherein the system reaches out to the database and watches, observes, or checks the database for changes, updates, and the like. In other embodiments, a system may passively monitor a database, wherein the database provides information to the system and the system then watches, observes, or checks the provided information. In this regard, the system may analyze and consider both competed and pending resource transfers.

The system may analyze the resource data to generate resource transfer analysis, wherein analyzing the resource data comprises determining resource transfer patterns. The system may then generate resource transfer analysis comprising categories of user outflow resource transfers/spending, resource transfer amounts and frequency, user resources utilized based on type of transfers and transfer amounts, resource transfer patterns and the like. In some embodiments, the system may determine resource transfer analysis comprising a forecast of the determine balances, schedules, and goals. The system may initiate a display of the resource transfer analysis interface comprising the above information. The display/overlay of the resource transfer analysis interface of the user resource application on the mobile device may be substantially similar to the display of the resource transfer interface described previously. In some embodiments the resource transfer analysis interface includes a selectable dashboard. The display is presented, in some embodiments, as an overlay over an already displaying mobile device display. In some embodiments, the user resource application may display a snapshot illustration of the user resources, resource transfer history within a time period, associated entities and the like based on the user input comprising certain user resources and/or a certain time period.

In some embodiments, the system may generate a resource tracking and allocation interface configured for presenting the resource levels of the user resources, the resource availability for usage and the resource transfer analysis on the mobile device, via the operative communication link. The resource tracking and allocation interface may comprise some or all of the user resources based on user selection, frequently used user resources or any other suitable criteria. In some embodiments, the resource tracking and allocation interface may be similar to the resource transfer interface.

Next, as illustrated in block 212, the process flow 200 includes formulating one or more resource allocation tools. The system may formulate one or more resource allocation tools based on at least the user goals and the resource availability for usage. The user goals may be determined by the system based on analysis of user information or may be specified by the user. The system may also formulate/construct the resource allocation tools based on the user's resource transfer patterns, type of user resources, user preferences and the like. Therefore, the one or more resource allocation tools are specific to a user and may vary from one user to another. Typically, the one or more resource allocation tools are directed to optimal allocation and control of resources for budgeting user's resource transfers, completion of user's goals, resource growth and savings, appropriate investment of resources to foster growth, reduction in outflow resource transfers and the like. The resource allocation tools may comprise an automatic resource allocation tool, a restrictive reallocation tool, an interactive resource allocation tool, visual stimulus reallocation tool, an automatic resource stabilizer tool and the like. Each of these tools may control, perform allocations or initiate resource transfers from one or more user resources and are described in detail elsewhere in the specification. The system may then initiate a presentation of the formulated resource allocation tools, via the display of a resource allocation interface of the user resource application. The system may enable the user to modify the resource allocation tools via the interface.

The system may further initiate implementation of at least one resource allocation tool based on identifying at least one trigger event, as illustrated by block 214 of process flow 200. The system determine, for each user resource, at least one trigger event associated with the user resource. In some embodiments, the system determines the trigger event in real time or near real time. The system may then retrieve information associated with the formulated resource allocation tools and determine at least one optimal resource allocation tool based on comparing the identified trigger event/events with the resource allocation tool information. In some embodiments, each resource allocation tool may be correlated with one or more specific trigger events. In some embodiments, the system may then, automatically, initiate the implementation of the at least one resource allocation tool. While in other embodiments, the system transmit notifications to the user device, indicating the identified trigger event and the determined at least one resource allocation tool, suitable for the trigger event, and initiate the implementation of the tool after receiving confirmation from the user. Initiation of the implementation of the at least one resource allocation tool may further comprise transmitting control instruction to the user mobile device to present the resource allocation interface. In this regard, the resource allocation interface may comprise information associated with the deployed resource allocation tool, user resources involved and resource levels, status of implementation or percentage completion, previous implementation of resource allocation tools, and the like. The resource allocation interface may be similar to the other interfaces of the user resource application described previously, for example, by overlaying the interface on the display of the mobile device.

In this regard, the system may monitor the user resources and associated resource data from the sources, and determine activities, changes in resource levels and current resource levels associated with the user resources. The activities may be conducted by the user, for example, modifying user information by changing user contact information, initiating resource transfers by making purchases, formulating resource goals, modifying alert/notification preferences, checking/viewing resource levels and resource transfer history and the like. The activities may be conducted by the system or systems associated with other entities, for example, performing resource transfers associated with existing automatic bill payments/transfers, depositing interest accrual associated with a savings account resource and the like. In some embodiments, the trigger events may be activities that cause a change in the resource level of a particular resource, for example, inflow and outflow resource transfers. In some embodiments, the trigger events may be time based triggers. For example, the system may receive instructions from the user to implement a particular resource allocation tool on the $5^{th}$ of every month. Here, the days of a year with 5 as the day/date may be the trigger event. In some embodiments, the trigger events may comprise a threshold resource level, a threshold value of resource transfers and the threshold number of resource transfers. For example, the system may initiate implementation of a particular resource allocation tool on determining that the resource level of a certain user resource is below a threshold value or that the cumulative values/amounts of outflow resource transfers has exceeded a threshold. In some embodiments, the trigger event may comprise determining that the user has initiated/requested the implementation of the at least one resource allocation tool. In some embodiments, the trigger events may be random, in that the resource allocation tools may be implemented based on a random function with one or more inputs comprising time, resource value, threshold and the like. In some embodiments, the trigger event may be the implementation of another resource allocation tool. In some embodiments, the trigger event may comprise a combination of any of the activities or events described above. The system may further transmit control signals to the mobile device that cause the user resource application to present notifications associated with the implementation of the at least one resource tool and the current levels of user resources. In this regard, the system may present the resource allocation interface, via the operative communication link, before and/or after the implementation of the at least one resource allocation tool with the current values of the resource levels of the user resources involved.

FIG. 3 illustrates various aspects of a real-time resource tracking and allocation platform 300. In some embodiments, the real-time resource tracking and allocation platform is associated with the user resource application. In this regard, the user resource application may present one or more interactive interfaces on a display of the user mobile device. These interfaces may be generically referred to as interactive resource interfaces and interactive resource interface dashboards and may similar to the interfaces described previously, for example the resource transfer interface. The user resource application may comprise a user settings interface 310, to enable the user to build user information and provide user preferences. In this regard, the system may enable the user to setup authentication credentials for access to the user resource application and provide authorization/authentication credentials required for the system to access the user resources and retrieve resource data from the source of the resources at user authorization interface 312. In some embodiments, the user authorization interface 312 is invoked for all instances that involve receiving authentication credentials from the user. The user settings interface 310, further comprises a notification and alerting mechanism 314. The system may transmit control instructions that cause the notification and alerting mechanism 314 to provide visual, auditory and/or vibratory alerts and notifications. In some embodiments, the notification and alerting mechanism 314 may enable the user to set up notification preferences.

The user resource application may further comprise a user resource allocation interface 330. The user resource allocation interface may display the determined resource availability for usage 332. In some embodiments, the resource availability for usage may be determined based on receiving user financial information from one or more existing budgeting applications or financial applications. In this regard, in addition to displaying the resource availability for usage the interface may further display visual representation of transfers, graphical representation of resource values required for critical tasks, total savings aggregated from one or more savings accounts and the like. In some embodiments, the user resource allocation interface 330 may display the user resources 334, either determined by the system or provided by the user. The system may also present at least a portion of the resource data associated with the user resources. The interface 330 may further comprise a display of user goals 336 and associated information like percentage completion, status (active, paused and the like), resource values, visual representation of the goals and the like.

The user resource application may further provide a real-time user resource tracking interface 350. The resource tracking interface 350 may comprise displays of current resource levels associated with the resources, inflow resource transfer snapshot 352 comprising one or more inflow resource transfers associated with the resource transfer history, outflow resource transfer snapshot 354 comprising one or more outflow resource transfers associated with the resource transfer history and the like. In some embodiments, the system may initiate displays of visual representations of outflow resource transfer categories, graphical representation of transfer trends over a time period and the like. Typically, the various interfaces described herein are customizable based on user requirements.

In some embodiments, real-time resource tracking and allocation platform 300 provides a user resource allocation interface 370, via the user resource application. The user resource allocation interface 370 may comprise the resource transfer analysis 372 described previously. The user resource allocation interface 370 may further comprise a display of one or more resource allocation tools formulated at block 212. Based on user selection, the system may initiate separate interfaces/dashboards for each of the resource allocation tools. In some embodiments the system may generate composite tools comprising features of two or more tools described herein. In some embodiments, the at least one resource allocation tool comprises an automatic resource allocation tool. The automatic resource allocation tool provides reallocation of inflow resource transfers to a savings resource, in real-time, to prevent the resource inflows from being absorbed into the user's spending or outflow resource transfers, described in detail with respect to FIG. 6. During implementation of the automatic resource allocation tool, the system may identify the at least one trigger event comprising an inflow resource transfer into a transactional resource of the user resources, wherein identifying the at least one trigger event comprises determining an inflow resource transfer value associated with the trigger event. The system may then determine a savings resource of the user resources comprising a savings resource level. In response, the system may initiate, automatically and in real-time, an outflow resource transfer from the transactional account such that at least a portion of the inflow resource transfer value is transferred to the savings resource, wherein the outflow resource transfer causes an increase in the savings resource level.

In some embodiments, the implemented resource allocation tool is a restrictive reallocation tool 384. Typically, the restrictive reallocation tool aims to restrict outflow resource transfers from a resource. In some embodiments, the system may require double verification or authentication from the user before allowing the outflow resource transfer, thereby providing increased security and authorization level for the resource transfer. In this regard, the system may identify the at least one trigger event comprising an initiation of an outflow resource transfer from a first user resource of the user resources via a first application of the mobile device, wherein the first application is a third party application configured to allow the user to initiate resource transfers from user resources based on verification of a first authentication credential. The system may then generate a double verification requirement for the first application, wherein the double verification requirement is a second authentication for transferring resources via the first application. Next, the system input/insert the double verification requirement into the first application, wherein inputting the double verification requirement includes inputting code that requires the user to verify using the double verification prior to allowing the application to transfer resources. Finally, the system may restrict the outflow resource transfer from the first user resource until the completion of the double verification requirement, wherein the completion of the double verification requirement comprises the successful validation of a second authentication credential received from the user. In some embodiments, the system provides an interactive resource allocation tool 386, which encourages the user to save based on gamification of the saving steps. This gamification approach may be combined with any of the resource allocation tools and resource transfer steps to achieve faster and optimal allocations based on user input, described in detail with respect to FIG. 7.

In some embodiments, the system initiates the implementation of a visual stimulus reallocation tool 388. This tool is directed to presenting visual stimuli associated with user goals when user initiates an outflow resource transfer from a resource, to prevent impulse withdrawals and to enable the user to visualize allocations to goals during savings transfers. The system may generate contextual visual elements associated with the user's goals. The system may then display the visual element for a predetermined amount of time, while locking all other functionality, to encourage the user to consider initiating a savings activity instead of the outflow expense. Specifically, the system may identify the at least one trigger event comprising an initiation of an outflow resource transfer from a first user resource of the user resources via a first application of the mobile device, wherein the first application is a third party application configured to allow the user to initiate resource transfers from user resources through a first interface presented on the display. The system may also generate a contextual visual representation of a goal product or service for the user resources. Next, the system may present the generated contextual visual representation on the display associated with the mobile device, wherein the generated contextual visual representation upon presentation, locks the functionality of the first application for a predetermined time period. Furthermore, the system may restrict the outflow resource transfer until the identification of a second trigger event, wherein the second trigger event comprises at least one of (i) lapse of the predetermined time period and (ii) receiving a user input comprising reallocation of the outflow resource transfer to a savings resource of the user resources.

In some embodiments, the system implements an automatic resource stabilizer tool 390. This tool aims to achieve steady state outflow resource transfers for the user in a predetermined time period. For example, if the user underspends in a month in comparison with a stabilized threshold (average expenses), the system may reallocate the difference to a savings account to preclude reabsorption of the additional resources into user spending. In another aspect the system may aim to achieve steady state inflow resource transfers by diverting any additional inflow/earnings to a savings account. Specifically, the system may determine a transactional resource of the user resources comprising a first resource level. The system may then identify the at least one trigger event associated with the transactional resource, wherein identifying the at least one trigger event comprises determining that the first resource level is greater than a predetermined stabilizer threshold. Additionally, the system may determine a savings resource of the user resources comprising a savings resource level. Finally, the system may initiate a resource transfer from the transactional resource to the savings resource such that a first resource value of the transactional resource is transferred to the savings resource, wherein the resource transfer is configured to decrease the first resource level to the predetermined stabilizer threshold.

FIG. 4 illustrates a process map illustrating the real-time determination of resource availability process 400, in accordance with one embodiment of the present invention. Block 410 illustrates a number of user resources, such as types of accounts, investments, annuities, property, or the like that may provide a stream of inflows or payments over a period of time, but which may also be illiquid or otherwise difficult to convert into cash. For example, types of user resources that provide disbursements may be a 401K that requires minimum disbursements to the user over a period of time at a specific time; an IRA that requires minimum disbursements to the user over a period of time at a specific time; a pension account that may provide disbursements until the user passes away; insurance benefits that may be distributed as an annuity for a period of time or as a lump sum; a trust account from which disbursement are made, property that provides rental earnings to the user, social security earning that pays disbursements for a period of time (e.g., a specific amount of time or for the life of a beneficiary), or other like annuity. In some embodiments of the invention the user resources may include estimated rates of returns such that not only are the disbursements used in determining the available fund amount and/or time parameter, but the principal and growth of the principal over time may be used in determining the available fund amount and/or time parameter.

Block 430 illustrates liquid (e.g., liquid or semi-liquid) user resources, such as accounts that may be equivalent to cash or resources that can be converted quickly into cash. For example, the liquid accounts may be financial transactional accounts like checking accounts, savings accounts, self-directed investment accounts, money market accounts, or the like. These liquid accounts may be utilized to pay for the outflows or outflow resource transfers directly. In some embodiments these types of accounts may be one of the last accounts that may be utilized to pay for outflows after the inflows from block 410 are exhausted (e.g., with the exception of lifetime annuity accounts). Some of these accounts may also have rates of return (e.g., savings accounts, self-directed investment accounts, or the like) which may be factored in when calculating the available fund amount and/or the time parameter.

As illustrated in block 440 the outflows or outflow resource transfers of the users may include the payments that the user makes in order to live (e.g., necessary or semi-necessary to the user for the living expenses and other expenses of the user). For example, in some embodiments the outflows may include housing outflows, which may cover the expenses of the user for house payments, taxes, insurance, or the like that the user has to pay in order to maintain a residence. In other examples, the outflows may be related to bills, such as electric, gas, water, or the like. The user's yearly estimated cost may be included. The user may have car payments that are due on a monthly (or other time period) basis. The user may also have insurance payments for the user's car, life, or the like. In addition, there may be other outflows, such as but not limited to child care payments, cell phone payments, internet, and/or other entertainment expenses that may or may not be included in the outflow calculations (e.g., may or not be considered essentials or semi-essentials). The outflows may also include some life event outflows that may be easily predictable, non-repeating outflows, and/or only periodic outflows (e.g., occurs more than the time period for which the outflows are calculated), such as but not limited to paying for a child's college, paying for a wedding, or other like life events that affect the user's outflows. As illustrated by block 410 and 430 some of these outflows may be paid by one or more of the inflows, the supplemental employment earnings inflow, and/or the liquid resources either directly or indirectly. As such, one or more of the user's resources may have a balance that is depleted over time as the outflows are paid.

Block 420 illustrates a real-time current account balance for all resources available to the user based on the resources identified in block 410 and 430 and subtracted the up to the minute outflows from block 440. It should be understood that the determination of the available fund amounts over the time period may change in real-time or near real-time as the rate of return on the resources change (e.g., stock values change, rental income changes or goes away, resources are depleted, big purchases are made or sold, or the like), and costs of the expenses change (e.g., damage to property than needs repair, variable interest rate changes, life events occur that deplete resources, loans are taken out or paid off, or the like). As such, the present invention may be constantly in real-time or near real time, or over various intervals, recalculated in order to provide a more accurate available fund amount and/or time parameter to the user, such that the user is better able to plan for retirement. Moreover, as illustrated in further detail later the user may be able to adjust the available fund amount and/or the time parameter in order to determine how changes in spending habits affect the time at which the user's resources are depleted, or vice versa.

As illustrated in block 450, the process 400 continues by compiling the inflows 410, liquid resources 430, outflows 440, current balances 420, and scheduled savings goals 460 into a forecast including an interactive resource interface with dashboard applications provided by the user resource application. The system may determine and subsequently display a forecast of the determine balances, payment schedules such as outflows, and goals via an interactive resource interface that includes a selectable dashboard. The display is presented, in some embodiments, as an overlay over an already displaying mobile device display.

As illustrated on block 470, the forecast may refresh all balances, goals, and the like and be presented to a user via an interactive resource interface with dashboards. The interaction allows the user to manipulate spending and savings thus illustrating an adjustment to future spending and/or future saving. As such, the system presents the user with a real-time illustration of future resource implications based on the adjustments to spending and/or savings. The interactive resource interface including dashboard may appear via overlay on a mobile device screen such as during a web session, texting session, telephone session, gaming session, or the like being conducted on the mobile device. Thus, the dashboard may displace one or more portions of the web session on the display, as such manipulating the physical position of the displaying of the web session, text session, telephone session or the like such that the dashboard may be displayed and visualized as an overlay.

Based on the user interaction with the interface, the system may project future view of a forecast for user resources. The forecast may illustrate all user resources and the impact of those resources upon one or more manipulations to the spending and/or saving of a user via mock manipulation of the inflows 410, current balances 420, liquid resources 403, outflows 440, and scheduled goals 460 and circulate through the process 400 with these future looking projections based on the user manipulations. Thus, the system may present the user with a projected future forecast based on user manipulations of the various data points associated with the database.

FIG. 5 illustrates a process map for the real-time determination of resource availability process 500, in accordance with one embodiment of the present invention. As illustrated by block 502, the system receives an indication that a user wants to evaluate his/her resources. For example, the user may desire a real-time view of all resources available to the user. In another example, the user may desire to manipulate his/her resources and distribute the resources to various other accounts or the like. In yet another example, the user may desire to perform a mock resource move, thus the system may illustrate how the mock move of resources may affect all of the user's resource at a current time or future time.

As illustrated by block 504, the system may identify the user and user information for authorization to access the resource interface similar to the embodiments described with respect to block 204 of process flow 200. Once the user has been authenticated and the user information has been identifies, the system may access real-time information about each of the user's resources. Block 506 illustrates that the system may access the resources of the user (e.g., the resources described with respect to blocks 410 and 430 in FIG. 4). For example, the system accesses resource information from the user's accounts that a financial institution services. In this way, the system may utilize the authorization information provided from the user to access, via web portals, the resource activity. In other embodiments, the system may contact one or more financial institutions or entities holding user resources to request and obtain access to the resource data. The user may also allow the system to access the user's accounts/resources with other third-parties and/or financial institutions. Moreover, the system may evaluate other resources that the system knows that the user owns, such as for example the system has information about the property that the user's own, and thus can evaluate the value of the resource and/or the future value over of the resource over time.

As illustrated in block 508 the system accesses the expenses of the user (e.g., the expenses described with respect to block 440 in FIG. 4). For example, the system accesses expense information from the user's accounts that a financial institution services. The user may also allow the system to access the user's accounts with other third-party financial institutions (e.g., first mortgage, second mortgage, or the like). As such, the system may evaluate the expenses that the user has that may affect the forecast planning of the user.

It should be understood that with respect to blocks 506 and 508, as well as otherwise described herein, in some embodiments of the invention the current and/or future fair market value of the resources or expenses may be determined by accessing third-party servers, systems, devices, applications, or the like in order to determine the fair market values. For example, the system may access websites that provide estimates of home values, car values, antique values, or the like.

Block 510 illustrates that the system determines the past/future fund inflows for the user. For example, the system can determine the amount of funds that the user has received from various accounts within and outside of a financial institution over time. With respect to the accounts serviced by a financial institution the system may access to the past/future fund inflows. With respect to accounts located outside a financial institution the past fund inflows may be determined by identifying the inflow of funds into the accounts held by a financial institution. Moreover, as previously discussed the user may allow the system to access the user's accounts to determine any past/future funds that the user may receive from various resources. Moreover, the system may determine the resources of the user that have yet to provide inflows (e.g., 401k accounts that cannot be accessed until a specific time, or the like). In some embodiments the system may estimate the future inflow of funds, for example, if the user receives the same payments continuously in consecutive time periods the system may continue to estimate the same fund receipts in future time periods.

In some embodiments, the user may have resources that only the user is aware of, and as such the user may provide an indication of the unidentified user resources to the system to include in the calculation of the user's resources and/or fund in-flows for the resource interface. In some embodiments the unidentified resources may include money being paid back for a loan provided by the user that the system does know about, the user is a beneficiary of an account that the system does not know about, the user is a silent partner in business that the system does not know about, or the like.

In some embodiments, the system may analyze the resource outflows or outflow resource transfers in order to determine what may qualify as an outflow that is necessary or critical (e.g., necessary or semi-necessary to cover cost of living expenses), such as mortgages, heat, water, gas, phone, internet, or the like, from any discretionary spending that may cover payments the user may make for entertainment (e.g., trips, dinner out, movies, shows, presents, or the like), such as payments that would be covered by the calculated available fund amount. As such, the transactions made by the user that may be discretionary may be utilized to determine an estimated available fund amount that the user is currently spending, which may be augmented by inflation rates in order to determine what the available fund amount may be in the future. As such, the available fund amount may be set in order to determine what the user likely wants to have available to the user in the future.

Block 512 illustrates that the system determines the estimated future inflows that the user receives based on the past inflows and future inflows determined from block 510. The system may determine the estimated inflows that the user may receive (e.g., may decide to receive, may be required to receive based on applicable laws, or the like) in the future. The estimated inflows may be averaged over a one or more time periods (e.g., short term, long term, or the like), may be determined for one or more time periods, or may be determine until reaching the time parameter. In some embodiments, the estimated future inflows may be based on a user mock movement of resources from one account to another. In this way, the system may determine the impact of a movement of resources on the other resources associated with the user.

Block 514 illustrates that the system determines the past and future scheduled resource outflows for the user. For example, the system can determine the amount of funds that user has paid from various accounts within and outside of a financial institution over time to a specific vendor or on a cyclical pattern. In this way, the system may identify monthly expenses for the user. The system may first identify cyclical monthly expenses for the user. The system may extract data from financial institutions and identify patterns in payments from accounts of the user to one or more specific venders. These patterns may include cyclical payments to the same vendor, similar amounts of payments to the same vendor, or the like. In some embodiments, the system may, via communication linkage, communicate with the vendor directly in order to determine cyclical payments of a user.

Based on the identified monthly expenses, the system may parsing out the monthly expenses for a granular view of the individual payment from the user. In this way, the system may parse out the identified monthly expenses to a granular level, such that the date, time, product/service, amount, and merchant for each payment identified is revealed. In this way, the system may utilize and compile data received from the user, financial institution, and vendor in order to identify the date, time, product/service, amount, and merchant for each identified cyclic expense. The system may access to the past/future fund outflows by examining the payments that the user has made over time (e.g., in the past) and/or has scheduled in the future. This may be performed by accessing a financial institution system or via system authorization for access to the resources of the user based on user provided authorization credentials. In some embodiments the system may estimate the future outflow of funds, for example, if the user makes the same payments continuously in consecutive time periods the system may continue to estimate the same payment in future time periods. For example, the system can determine the amount of funds that the user has sent for payment from various accounts within and outside of a financial institution over time. Moreover, the system may determine the expenses of the user that have yet to provide outflows (e.g., annuity payments that the user may make in the future, payments scheduled for a trust account, payments to fund a future resource purchase, or the like). In some embodiments the system may estimate the future outflow of funds, for example, if the user makes the same payments continuously in consecutive time periods the system may continue to estimate the same payments in future time periods.

In some embodiments, the user may have expenses that only the user is aware of, and as such the user may provide an indication of the unidentified expenses to the system to include in the system's calculation of the user's expenses and/or fund out-flows. In some embodiments the unidentified expenses may include money the user is paying back for a loan provided to the user (e.g., loan from a family member or friend, or the like) that the system does know about, the user is supporting a dependent that the financial institution does not know about, the user is a silent partner in business that the system does not know about, or the like.

Block 516 illustrates that the system determines the estimated future outflows that the user pays based on the past outflows and future outflows. The system may determine the estimated outflows that the user may pay (e.g., may decide to pay, may be required to pay based on applicable laws, payments made to cover expenses, or the like) in the future. The estimated outflows may be averaged over a one or more time periods (e.g., short term, long term, or the like), may be determined for one or more time periods, or may be determine until reaching a user specified time parameter. Next, as illustrated in block 517, the system may display on an interactive resource interface a forecasted balance of the user resources. As such, the system may convert data extracted from the sources in blocks 506, 508, 510, 512, 514, and 516 into a structured format for monitoring and implementation into the forecast. In this way, the data may be converted into a textual format encrypted for security use for only real-time determination of resource availability resource interfaces and dashboards. Once the data is removed from the interfaces or dashboards, the system encryption may prevent the data from being readable in any other medium.

As illustrated in block 519, the system may calculate a projected forecast based on user selections. In this way, the user may select, via the interactive forecast display of block 517 to manipulate in a mock or example fashion various resources to illustrate the effect of the manipulation on other resources at present or in the future. Furthermore, the interactive forecast display of block 517 also allows for real transfer and manipulation of funds across the resources of the user.

As illustrated in block 521, the system may also calculate expense smoothing for the user. Expense smoothing is detailed above in FIG. 3. Based on the identified resources from blocks 506, 508, 510, 512, 514, and 516, the system may determine a granular level of each expense associated with a resource. In this way, the date, time, product/service, amount, and merchant for each expense or payment identified is revealed for identified cyclical payments. In this way, the system may utilize and compile data received from the user, financial institution, and vendor in order to identify the date, time, product/service, amount, and merchant for each identified cyclic expense. Next, the system may extract or retrieve the user's budget information for each expense. In some embodiments, the user may have a budget for each cyclical expense, such as a loan payment, electric bill, or the like. These budgets may be utilized to later identify and produce a steady-state stabilization for the user resources.

Next, as illustrated in block 522, the system may display the expense smoothing along with the savings activities, goal progression, saving projections, spending categories, and forecasts onto the resource interface and/or onto selectable dashboards associated therewith. The interface and dashboards may appear via overlay on a mobile device screen such as during a web session, texting session, telephone session, gaming session, or the like being conducted on the mobile device. Thus, the interface may displace one or more portions of the web session on the display, as such manipulating the physical position of the displaying of the web session, text session, telephone session or the like such that the interface may be displayed and visualized as an overlay.

As illustrated in block 523, the system allows a user to take a real-time snapshot of the interactive resource interface data. The snapshot may be stored and exported to one or more programs for resource management or storage. Otherwise, the data on the resource interface that has been converted into a textual format encrypted for security use for only real-time determination of resource availability resource interfaces and dashboards. Once the data is removed from the interfaces or dashboards, the system encryption may prevent the data from being readable in any other medium.

As illustrated in block 526, the system, via the interface may receive an indication from the user to adjust spending, saving, or other illustrated metrics on the interface. In some embodiments, the user may be preparing for a large purchase with the adjustment and wishing to view resource implications from the purchase. In other embodiments, the adjustment may reflect an actual move of resources, such as a purchase or reallocation of resources to one or more alternative sources. In yet other embodiments, the adjustment may be a mock adjustment to visualize different accounts or mediums for a user to put resources. The system may also allow a user to add an additional mock account to add resources to, thus giving the user a visualization of overall resources if implementing a new account. As such, this may provide a user with a past, future, or present view of all resources allocated in a variety of ways to determine the best allocation for the user at that time. As illustrated in block 528, the system may recalculate and update the resource interface with the adjustments from block 526. Finally, the system may present the user with the updated interface with dashboards and similar snapshot capabilities for the updated adjustments, as illustrated in block 529.

FIG. 6 provides a high level process flow illustrating the real-time resource optimization allocation process 600, in accordance with some embodiments of the present invention. In some embodiments, process 600 is directed to the implementation of the automatic resource allocation tool by the system. Typically, inflow resource transfers, such as paychecks are directed to a transactional user resource like a checking account. The user may reallocate the inflow with outflow resource transfers, from the transactional user resource, as payments for both critical tasks and discretionary spending, for example, through a payment instrument like a check or debit card. However, often, the outflow resource transfers comprise complete absorption or reallocation of a substantial portion of the inflow, with little or no savings. There is a need for systems and tools that provide automatic reallocation of the resource inflows from a transactional resource to a savings resource. The automatic resource allocation tool provides reallocation of inflow resource transfers to a savings resource, in real-time, to prevent the resource inflows from being absorbed into the user's spending or outflow resource transfers. This is beneficial since, the reallocation into a savings resource enables accumulation of resources that may be used for completion of user goals or user requirements in the future, since savings resources are configured to restrict outflow resource transfers. Another aspect of the automatic reallocation tool involves automatic reallocation of resources from the savings resource to an investment resource associated with the user to foster resource growth.

As illustrated in block 602, the process 600 is initiated by determining resources associated with the user. In this regard, the system may establish an operative communication link with the mobile device associated with the user and transmit and store at least a portion of the user resource application on the mobile device. The system may then determine user resources based on analyzing mobile device data extracted from the mobile device, via the operative communication link, similar to the embodiments described with respect to block 202.

Next, as illustrated in block 604, the process 600 continues by extracting resource data from a source of each user resource associated with the user, wherein resource data comprises real-time resource level, resource transfer history, resource transfer schedules and user goals for each user resource. In this regard, based on receiving the requisite authorization credentials from the user, the system may retrieve the resource data from the sources of the resources and transform the extracted resource data into a textual format encrypted for use only on an automatic resource allocation interface associated with the user resource application, similar to embodiments described previously, particularly those described with respect to block 204.

As illustrated on block 606, the process 600 further comprises continually monitoring the user resources for resource transfers and changes in resource levels, as described previously. In this regard, the system may determine a first user resource of the one or more user resources. The system may determine a first resource level associated with the first resource. In some embodiments, the first resource is a transactional resource comprising a checking account or a transaction/current account associated with a first financial institution. A transactional resource typically provides easy access for the user to conduct resource transfers to fulfill day-to-day requirements of the user. Typically, a transaction resource holds resources or funds that are available for frequent and immediate access and initiation of outflow resource transfers. In this regard, the transactional resources are configured for conducting resource transfers using financial instruments (for example, debit cards, checks, credit cards), online banking, mobile banking using tokens/aliases of account numbers through digital wallets, transaction terminals such as ATMs and point of sale terminals and other suitable means. Restrictions on resource transfers are relaxed for the transactional resources and the interest provided for the transactional resources is lower in comparison with other resources like savings resources or investment resources.

Based on the continual monitoring of the user resources, the system may identify at least one trigger event comprising an inflow resource transfer into the first user resource, as depicted by block 608. In this regard, the system may also determine an inflow resource transfer value associated with the resource transfer. As discussed, the first user resource may be a transactional resource with an inflow resource transfer, that when completed may cause an increase in the first resource level. For example, the system may determine a checking account of the user with a first balance or resource level comprising initial available funds. The system may then determine that a first amount of funds (inflow resource transfer value) associated with the user's paycheck are being deposited (inflow resource transfer) into the checking account. This deposit may be directed to a pending transaction that has been approved for payment, which may be completed/settled at a predetermined future instance. In other instances, the deposit or inflow resource transfer may be directed to a posted transaction that has been processed for payment and the associated funds have been received at the first financial institution.

In some embodiments, the system may retrieve resource data, resource transfer schedules and the determined resource availability for usage, in real time. The system may analyze the resource data, resource transfer schedules and the determined resource availability for usage in conjunction with the first resource transfer value, to ascertain whether the user would require the some or all of the incoming first resource transfer value/funds for critical tasks. For example, the system may analyze the resource data associated with the user's checking account and determine that the user would require a certain amount/resource value for critical tasks in that time period, for example, a month/week, before another scheduled/expected inflow resource transfer in the future. The system may also determine that the current resource availability for usage (difference between the first resource level and the required amount for critical tasks) exceeds the requirement, and that the incoming first resource transfer value would not be vital for the time period. Therefore, the system may determine that transferring the first resource value, once posted in the first user resource, to a savings resource may be beneficial, since this would allow for accumulation of resources in the savings resource and also for resource growth, for example, due to interest accrued.

As another illustration, the system may determine that a portion A of the inflow resource transfer value would be required for critical tasks of the user to account for a deficit in the current resource availability for usage. The system may further determine that a minimum balance/resource level B is required for the first resource and that based on user input, the user would require an amount/resource value C for discretionary spending in the time period. The system may then determine an outflow transfer amount from the first resource to a savings resource equal to the difference between inflow resource transfer value and aggregate value of allocations A, B and C. Therefore, the automatic resource allocation tool conducts dynamic savings activities based on current user requirements, resource data and user goals. As another example, the system may determine a predetermined value of optimal savings percentage P for the user. The savings percentage P may be directed to a percentage of a total amount required for a goal, a percentage of the inflow resource transfer value to the first resource, a user defined value and the like. The system may then seek to transfer a portion of the inflow resource transfer to the first user resource that corresponds to the value/amount associated with the percentage P. In some embodiments, the system may automatically, or in response to a user input, determine a progressive growth rate of savings to achieve savings goals in a shorter time period and to preclude disruptions in the user's spending and budgets due to abrupt large allocations, and to gradually acclimatize the user to savings transfers. In this regard, the percentage P may increase over predefined time periods. For example, a percentage P of 3% for a first month may be increased to 5% for the second month, 7% for the third month and so on. In some embodiments, the system may initiate recurring transfers between the transactional and savings accounts.

Therefore the system may determine a second user resource directed to a savings resource comprising a second resource level. The savings resource may comprise a savings account, a money market account, a certificate of deposit and the like. Savings resources typically restrict resource transfers, specifically outflow resource transfers from the resource, within a time period. Savings accounts also typically enable the user to accumulate interest on funds or the second resource level that may be compounded on a daily, weekly, monthly, or annual basis. After transfer the savings resource level would increase by the first resource transfer value or the amount of funds that were transferred. The funds in the savings resource may be earmarked for the future needs of the user. The second user resource may be associated with the first financial institution or another financial institution.

In the instances where the user may be associated with multiple savings resources, the system may choose the second user resource based on factors like amount being deposited, interest value provided by the savings account, minimum deposit time before first withdrawal, minimum deposit amount, financial institution associated with the savings account, number of permissible deposits and the like and their relation with the resource data and user goals. For example, the system may determine the second user resource comprising a savings account based on determining that the second user resource is associated with the first financial institution, for ease of transfers between the first user resource and the second user resource. As another example, the system may determine a user goal of saving for the user's child's education and that based on the current time, the child is likely pursue college education in 15 years. The system may then determine one or more Certificates of deposit (CD) accounts already associated with the user or new CDs provided by financial institutions associated with the user as suitable second user resources, based on determining that the term of the CD is less than 15 years and that the amount/outflow resource being transferred from the first user resource is greater than the minimum deposit amount for the CD. In some embodiments, the system allocates portions of the outflow resource transfer from the first user account to multiple second user resources. In some embodiments, the system initiates a presentation of the automatic resource allocation tool interface on the mobile device, comprising information associated with the first user resource, first resource level, inflow resource transfer value, resource availability for usage, available second user resources and the associated factors, optimal determined reallocation value and the like. The user may then review the presented information and provide a selection of at least one user resource, amount/portion of inflow to be reallocated, authorization for the resource transfer and the like.

At block 610, the system may then initiate, automatically, and in real-time, an outflow resource transfer from the first user resource such that at least a portion of the inflow resource transfer value is transferred to the second user resource, wherein the outflow resource transfer when completed cause an increase in the second resource level. In this regard, the system may determine the at least a portion of the inflow resource transfer value to be transferred based on the examples and factors discussed above. In some embodiments, system may further link the first user resource and the second user resource to facilitate future resource transfers and to avail one or more benefits of linked accounts. In this regard, the system may transmit control instructions to entity systems associated with the first and second user resources, based on receiving appropriate authentication and authorization from the user. The system may then transmit control instructions to the mobile device of that cause the user resource application to present notifications associated with the initiation of the resource transfer, status of the resource transfer, resource transfer value/amount and the like, via the automatic resource allocation interface.

In some embodiments, the system may initiate resource transfers from the first user resource and/or the second user resource to a third user resource configured to provide resource growth, as illustrated at blocks 612 and 614. The third user resource may be an investment resource comprising an investment account, joint investment account, individual retirement account, mutual fund investment accounts, and the like. In some embodiments, investment resources provide increased growth in comparison with savings resources. For example, the system may initiate the resource transfer based on determining that a particular stock specified by the user is currently at a predefined value. The system may also automatically initiate purchase of a certain number of the specified stocks via the investment resource.

In some embodiments, the system may initiate, automatically, and in real-time, an outflow resource transfer from the first user resource such that at least a portion of the inflow resource transfer value is transferred to the third user resource. In this regard, the system may determine the at least a portion of the inflow resource transfer value to be transferred based on the examples and factors discussed above, similar to the resource transfers to savings resources. In some embodiments, system may further link the first user resource and the third user resource to facilitate timely resource transfers. In this regard, the system may transmit control instructions to entity systems associated with the first and third user resources, based on receiving appropriate authentication and authorization from the user. In this regard, the system may generate trading authorization forms, account linking authorization forms and the like and transmit them to the mobile device. The system may retrieve templates of the forms from entity systems and prefill the forms based on application information and resource data associated with the user. Typically, the investment resources are configured with certain investment rules, either automatically or based on user selection. The transferred at least a portion of the inflow resource transfer value may be appropriately invested based on the rules and the performance and growth of the third user resource may be monitored continuously. The system may initiate transmission of alerts and notifications based on user preferences like upper and lower acceptable threshold values for the third resource, time-based recurring alerts and the like.

In some embodiments, the system may initiate, automatically, and in real-time, an outflow resource transfer from the second user resource such that a second resource transfer value is transferred to the third user resource. In this regard, the system may determine the at least a portion of the inflow resource transfer value to be transferred based on the examples and factors discussed above, similar to the resource transfers to savings resources. For example, the system may determine that the investment resource requires a minimum amount/principal to be invested. In this regard, the system may continuously monitor the savings resource for resource accumulation, and initiate, automatically, the resource transfer with the minimum amount, based on determining that the second resource level is greater than or equal to the minimum amount to be invested. In some embodiments, system may further link the second user resource and the third user resource and transmit notifications as described above.

FIG. 7 provides a high level process flow illustrating the resource allocation process 700 that is based on available resources and that may be conducted via an interactive interface, in accordance with some embodiments of the present invention. In some embodiments, process 700 is directed to the implementation of the interactive resource allocation tool by the system. In some embodiments, the interactive resource allocation tool aims to encourage a user to save and is specifically directed to users who are just beginning to save and users who do not have specific savings plans. This tool enables the user to start saving, determine savings requirements and configure the one or more resource allocation tools accordingly. In some embodiments, the system provides an interactive resource allocation interface that encourages the user to save based on gamification of the saving steps. This gamification approach may be combined with any of the resource allocation tools and resource transfer steps to achieve faster and optimal allocations based on user input. The system may further periodically alert the user to perform savings transfers for completion of goals. In other aspects, the system may enable the user to save a percentage of every purchase transactions.

As illustrated in block 702, the process 700 is initiated by determining resources associated with the user. In this regard, the system may establish an operative communication link with the mobile device associated with the user and transmit and store at least a portion of the user resource application on the mobile device. The system may then determine user resources based on analyzing mobile device data extracted from the mobile device, via the operative communication link, similar to the embodiments described with respect to block 202.

Next, as illustrated in block 704, the process 700 continues by extracting resource data from a source of each user resource associated with the user, wherein resource data comprises real-time resource level, resource transfer history, resource transfer schedules and user goals for each user resource. In this regard, based on receiving the requisite authorization credentials from the user, the system may retrieve the resource data from the sources of the resources and transform the extracted resource data into a textual format encrypted for use only on an automatic resource allocation interface associated with the user resource application, similar to embodiments described previously, particularly those described with respect to block 204.

As illustrated on block 706, the process 700 further comprises continually monitoring the user resources for resource transfers and changes in resource levels, as described previously. The system may transmit control instructions to the mobile device that cause the user resource application to present an interactive resource allocation interface on the display of the mobile device, wherein the interactive resource interface is configured to receive user input comprising physical gestures. The interactive resource allocation interface may comprise design elements and game principles in non-game contexts such as financial resource transfers. The interactive resource interface is configured to improve user engagement and productivity. The interactive resource interface may receive user input in the form of one or more gestures, interpret the gestures, dissect the gesture into gesture attributes and correlate the gesture with one or more financial activities. In this regard, the system may transmit control signals to the touch sensors, motion/orientation sensors like accelerometers and global positioning devices and the like associated with the mobile device, via the operative communication link. The control signals cause the sensors to receive the user input, measure one or more gesture attributes and transmit the received user input and the gesture attributes to the system. The system may receive an indication of one or more physical gestures of the user and their gesture attributes from the mobile device sensors. The system may then analyze the information and determine at least one trigger event comprising at least one gesture of the one or more physical gestures, at block 708.

The physical gestures may be in the form of tactile commands like touch patterns and swipe motions on a touch screen display of the mobile device, in the form of movement of the mobile device by changing the position and orientation of the mobile device in a three dimensional space, alone or on combination with voice commands provided by the user and the like. Each physical gesture may be associated with gesture attributes comprising at least one of a gesture direction, a gesture path, a gesture velocity, gesture pressure, start and end points and the like. Typically each of the gesture attributes may be assigned a value from a range of values based on measuring/analyzing the physical gesture. The gesture values of an attribute or a combination of attributes may be correlated with a financial activity, resource transfer and/or a user resource. These association and correlations may be predefined or may be defined by the user. In some embodiments, each gesture attribute is associated with at least one user resource.

The system may then determine a first user resource and a second user resource associated with the gesture attributes, at block 710. The correlation/association of the gesture attributes and the user resources are described with respect to the transactional, savings and investment resources of the process flow 600. For example, the system may identify a first physical gesture comprising a first swipe motion received from the user. The system may determine gesture attributes comprising a start point with coordinates of the display/screen center of the mobile device and an end point at a right edge of the screen with a curved path. The system may determine that the start point of the gesture is associated with transactional resource, the end point is associated with the savings resource and that the curved path indicates a resource transfer from the transactional resource to the savings resource. As another example, the system may determine a gesture comprising clockwise turns or swiveling of the mobile device and associated the gesture with resource transfer from the savings resource to the investment resource being associated with a predetermined resource transfer value or amount for each swivel/turn (for example, 5 cents, 1 dollar, 25 dollars and the like).

In some embodiments, the physical gestures are defined at a certain gesture pressure application on the screen by the user, such that the range of defined pressures is different that the pressures utilized by the user for other day-to-day conventional activities on the mobile device, like selecting, scrolling and the like, using the built-in interface or another application. In some embodiments, the system continuously monitors for the physical gesture inputs from the user, based on the resource application running in the background, while the user participates in one or more sessions. In some embodiments, determination of a physical gesture with a gesture pressure attribute within the defined range, causes the user resource application to automatically present an overlay of the interactive resource allocation interface on the existing session, with the determined resources involved in the resource transfer and the amounts involved. The system may enable the user to modify the resources or the amounts and provide a confirmation for the resource transfer. In other embodiments, the user resource application, running in the background, automatically initiates the resource transfer or places the transfer in a queue, while the user is continuing the active session. The system may transmit vibratory or audible notification to indicate the transfer. The user may be provided a certain window of time to rescind the transfer, before transmitting control instructions to the entity systems involved.

In some embodiments, the system may determine that the user is currently associated with a session on a first application of the mobile device, wherein the session comprises a display of a first application interface on the mobile device. In this regard the session on the display may be a web session, text session, or telephone session and the like. The system may determine a savings resource of the user resource comprising a savings resource level and one or more transactional resources of the user resources, wherein each transactional resource comprises a transactional resource level. The system may then present the interactive resource allocation interface via overlay on the display of the mobile device such that the interactive allocation resource displaces one or more portions of the session on the display, whereby manipulating the physical position of the displaying of the session, wherein the interactive resource allocation interface comprises a notification to initiate a resource transfer to the savings resource and a display of the one or more transactional resources and the transactional resource levels. The system may receive, from the user, a selection of at least one transactional resource, for example, via a physical gesture; and in response initiate a resource transfer from the at least one transactional resource to the savings resource such that a first resource value of the at least one transactional resource is transferred to the savings resource, wherein the resource transfer causes an increase in the savings resource level.

Based on determining the first user resource and the second user resource, the system may determine the current resource levels (first resource level and second resource level) prior to initiating the resource transfer. In some embodiments, the physical gestures are associated with predefined resource transfer values/amounts to be transferred. In some embodiments, the predefined resource transfer values are directed to small amounts of funds, so as to ensure periodic accumulation of the small amounts of savings. In some embodiments small amounts of funds/savings may comprise subdivisions of units of currency, for example, the amount transferred may be a two-hundredth subdivision of a particular unit of currency. In other embodiments, the user specifies the resource transfer value via the interactive resource allocation interface that is presented in response to identifying the trigger event comprising the physical gesture. The system may then initiate, automatically and in real-time, a resource transfer from the first user resource to the second resource such that a first resource transfer value/savings amount of the first user resource is transferred to the savings resource, wherein the resource transfer causes a decrease in the first resource level and an increase in the second resource level, at block 712. In this regard, the system may transmit control instructions to the entity systems associated with the first and second user resources, configured to cause the systems to perform the resource transfer.

In some embodiments of the invention, the system may automatically initiate or remind the user to initiate savings activities, whenever the user performs payments, purchases and other outflow resource transfers. In this regard, the system may identify the at least one trigger event comprising an outflow resource transfer from a first user resource of the user resources. The system may further, identify an outflow resource transfer value associated with the trigger event/the payment initiated by the user. The system may then determine a savings resource of the user resources comprising a savings resource level. The system may then transmit notifications to the user, to remind the user to save a first resource value/amount in addition to the outflow, the first resource value being a predefined percentage of the outflow resource transfer value. The system may receive an input from the user comprising a physical gesture described previously. In response, the system may initiate a resource transfer from the first user resource to the savings resource such that a first resource value of the first user resource is transferred to the savings resource, wherein the resource transfer causes an increase in the savings resource level. Therefore, there may be two outflow resource transfers from the first user resource, the first being the payment of the outflow resource transfer value and the second being the savings activity comprising an amount equal to a percentage of the payment.

In some embodiments, the system may seek to remind the user to perform savings activities periodically. For example, the system may determine that the user has not initiated any inflow resource transfers to a particular savings resource in a while. The system may then notify the user, reminding the user to initiate savings, or the system may automatically initiate the transfers to the savings resource. In this regard, the system may analyze resource data associated with a savings resource of the user resources, wherein the resource data comprises resource transfer history and a savings resource level associated with the savings resource. The system may then determine a closing inflow resource transfer into the savings resource, wherein identifying the closing inflow resource transfer comprises determining a first time associated with the closing inflow resource transfer. The system may further determine an elapsed time period between the first time and the current time and identify the at least one trigger event based on determining that the elapsed time period exceeds a predetermined threshold value. The system may also determine a transactional resource of the user resources comprising a transactional resource level, and in response initiate a resource transfer from the transactional resource to the savings resource such that a first resource value of the transactional resource is transferred to the savings resource, wherein the resource transfer causes an increase in the savings resource level.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time resource tracking and allocation, whereby the system provides a comprehensive integrated platform for identification, monitoring and optimal allocation of resources, the system comprising:
    at least one memory device with computer-readable program code stored thereon;
    at least one communication device;
    at least one processing device operatively coupled to the at least one memory device and the at least one communication device, wherein executing the computer-readable program code causes the at least one processing device to:
        establish an operative communication link with a mobile device associated with a user and provide a user resource application on the mobile device;
        determine user resources associated with the user;
        extract resource data from a source of each user resource of user;
        transform the extracted resource data into a textual format encrypted for use only on a resource tracking and allocation interface of the user resource application;
        determine resource availability for usage, wherein determining the resource availability for usage comprises determining resource values required for predetermined tasks of the user;
        analyze the resource data to generate resource transfer analysis, wherein analyzing the resource data comprises determining resource transfer patterns;
        formulate one or more resource allocation tools based on at least user goals and the resource availability for usage, wherein each of the one or more resource allocation tools is correlated with at least one trigger event;

identify, in real-time, at least one trigger event associated with the user resources;

identify, via the user resource application running in the background on the mobile device, a first physical user gesture during a current session on an active application interface of a first application on the mobile device;

determine, via one or more mobile device sensors, a plurality of gesture attributes associated with the first physical user gesture, wherein the plurality of gesture attributes of the physical user gesture comprise (i) a gesture direction, (ii) a gesture path, (iii) a gesture velocity and (iv) gesture pressure;

based on analyzing the plurality of gesture attributes of the first physical user gesture during a current session on an active application interface of a first application on the mobile device, (i) determine a first user resource associated with the determined plurality of gesture attributes, (ii) determine a second user resource associated with the determined plurality of gesture attributes, and (iii) determine a first resource transfer value associated with the determined plurality of gesture attributes of the first physical user gesture;

place, via the user resource application running in the background on the mobile device, a first resource transfer from the first user resource to the second resource in a queue while the user is continuing the current session on the active application;

provide, via the user resource application running in the background on the mobile device, a predetermined window of time for the user to rescind the first resource transfer;

in response to determining a termination of a predetermined window of time to rescind the first resource transfer, initiate, automatically and in real-time, the first resource transfer from the first user resource to the second resource such that the first resource value of the first user resource is transferred to the savings resource via at least one resource allocation tool of the one or more resource allocation tools, wherein the resource transfer is associated with a decrease in a first resource level of the first user resource and an increase in a second resource level of the second user resource; and present, via the user resource application, notifications associated with the implementation of the at least one resource tool and current levels of user resources.

2. The system of claim 1, wherein, the at least one resource allocation tool comprises an automatic resource allocation tool, wherein executing the computer-readable program code causes the at least one processing device to:

identify the at least one trigger event comprising an inflow resource transfer into a transactional resource of the user resources, wherein identifying the at least one trigger event comprises determining an inflow resource transfer value associated with the trigger event;

determine a savings resource of the user resources comprising a savings resource level; and initiate, automatically and in real-time, an outflow resource transfer from the transactional account such that at least a portion of the inflow resource transfer value is transferred to the savings resource, wherein the outflow resource transfer comprises an increase in the savings resource level.

3. The system of claim 1, wherein, the at least one resource allocation tool comprises a restrictive reallocation tool, wherein executing the computer-readable program code causes the at least one processing device to:

identify the at least one trigger event comprising an initiation of an outflow resource transfer from the first user resource of the user resources via the first application of the mobile device, wherein the first application is a third party application configured to allow the user to initiate resource transfers from user resources based on verification of a first authentication credential; and generate a double verification requirement for the first application, wherein the double verification requirement is a second authentication for transferring resources via the first application.

4. The system of claim 3, wherein executing the computer-readable program code causes the at least one processing device to:

input the double verification requirement into the first application, wherein inputting the double verification requirement includes inputting code that requires the user to verify using the double verification prior to allowing the application to transfer resources; and restrict the outflow resource transfer from the first user resource until the completion of the double verification requirement, wherein the completion of the double verification requirement comprises the successful validation of a second authentication credential received from the user.

5. The system of claim 1, wherein, the at least one resource allocation tool comprises a visual reallocation tool, wherein executing the computer-readable program code causes the at least one processing device to:

identify the at least one trigger event comprising an initiation of an outflow resource transfer from the first user resource of the user resources via the first application of the mobile device, wherein the first application is a third party application configured to allow the user to initiate resource transfers from user resources through a first interface presented on the display; and generate a contextual visual representation of a goal product or service for the user resources.

6. The system of claim 5, wherein executing the computer-readable program code causes the at least one processing device to:

present the generated contextual visual representation on the display of the mobile device;

lock, via the generated contextual visual representation presented in the display of the mobile device, the functionality of the first application for a predetermined time period; and restrict the outflow resource transfer until the identification of a second trigger event, wherein the second trigger event comprises at least one of elapse of the predetermined time period and receiving a user input comprising reallocation of the outflow resource transfer to a savings resource of the user resources.

7. The system of claim 1, wherein, the at least one resource allocation tool comprises an interactive resource allocation tool, wherein executing the computer-readable program code causes the at least one processing device to:

identify the at least one trigger event comprising at least one of (i) a predetermined physical user gesture having a gesture pressure attribute within a predetermined range, (ii) an elapsed time period since a prior inflow transfer of the second user resource exceeding a predetermined threshold, (iii) initiation of an outflow resource transfer from the first user resource, and (iv) the user input comprising the first physical user gesture.

8. The system of claim 7, wherein executing the computer-readable program code causes the at least one processing device to:
in response to the at least one trigger event, overlay, via the user resource application running in the background, an interactive resource allocation interface over the active application interface of the first application such that the interactive allocation resource interface displaces one or more portions of the active application interface on the display;
wherein the interactive resource allocation interface comprises a notification for the user to initiate the resource transfer, wherein the interactive resource interface is configured to receive user input comprising the first physical user gesture; and
wherein the first physical user gesture comprises at least one of a tactile touch pattern, a tactile swipe motion, and change of orientation of the mobile device in a three dimensional space.

9. The system of claim 1, wherein the at least one resource allocation tool comprises an interactive resource allocation tool, wherein executing the computer-readable program code causes the at least one processing device to:
identify the at least one trigger event comprising an outflow resource transfer from the first user resource of the user resources, wherein identifying the at least one trigger event comprises determining an outflow resource transfer value associated with the trigger event;
determine a savings resource of the user resources comprising a savings resource level; and
in response to the outflow resource transfer from the first user resource, initiate a second resource transfer from the first user resource to the savings resource such that a first resource value of the first user resource is transferred to the savings resource, wherein the resource transfer comprises an increase in the savings resource level.

10. The system of claim 1, wherein, the at least one resource allocation tool comprises an automatic resource stabilizer tool, wherein executing the computer-readable program code causes the at least one processing device to:
determine a transactional resource of the user resources comprising a first resource level; and
identify the at least one trigger event associated with the transactional resource, wherein identifying the at least one trigger event comprises determining that the first resource level is greater than a predetermined stabilizer threshold.

11. The system of claim 10, wherein executing the computer-readable program code causes the at least one processing device to:
determine a savings resource of the user resources comprising a savings resource level; and
initiate a second resource transfer from the transactional resource to the savings resource such that a first resource value of the transactional resource is transferred to the savings resource, wherein the resource transfer is configured to decrease the first resource level to the predetermined stabilizer threshold.

12. A computer program product for real-time resource tracking and allocation, whereby the computer program product provides a comprehensive integrated platform for identification, monitoring and optimal allocation of resources, the computer program product comprising a non-transitory computer-readable storage medium having computer-executable instructions to:
establish an operative communication link with a mobile device associated with a user and provide a user resource application on the mobile device;
determine user resources associated with the user;
extract resource data from a source of each user resource of user;
transform the extracted resource data into a textual format encrypted for use only on a resource tracking and allocation interface of the user resource application;
determine resource availability for usage, wherein determining the resource availability for usage comprises determining resource values required for predetermined tasks of the user;
analyze the resource data to generate resource transfer analysis, wherein analyzing the resource data comprises determining resource transfer patterns;
formulate one or more resource allocation tools based on at least user goals and the resource availability for usage, wherein each of the one or more resource allocation tools is correlated with at least one trigger event;
identify, in real-time, at least one trigger event associated with the user resources;
identify, via the user resource application running in the background on the mobile device, a first physical user gesture during a current session on an active application interface of a first application on the mobile device;
determine, via one or more mobile device sensors, a plurality of gesture attributes associated with the first physical user gesture, wherein the plurality of gesture attributes of the physical user gesture comprise (i) a gesture direction, (ii) a gesture path, (iii) a gesture velocity and (iv) gesture pressure;
based on analyzing the plurality of gesture attributes of the first physical user gesture during a current session on an active application interface of a first application on the mobile device, (i) determine a first user resource associated with the determined plurality of gesture attributes, (ii) determine a second user resource associated with the determined plurality of gesture attributes, and (iii) determine a first resource transfer value associated with the determined plurality of gesture attributes of the first physical user gesture;
place, via the user resource application running in the background on the mobile device, a first resource transfer from the first user resource to the second resource in a queue while the user is continuing the current session on the active application;
provide, via the user resource application running in the background on the mobile device, a predetermined window of time for the user to rescind the first resource transfer;
in response to determining a termination of a predetermined window of time to rescind the first resource transfer, initiate, automatically and in real-time, the first resource transfer from the first user resource to the second resource such that the first resource value of the first user resource is transferred to the savings resource via at least one resource allocation tool of the one or more resource allocation tools, wherein the resource transfer is associated with a decrease in a first resource level of the first user resource and an increase in a second resource level of the second user resource; and present, via the user resource application, notifications associated with the implementation of the at least one resource tool and current levels of user resources.

13. The computer program product of claim 12, wherein, the at least one resource allocation tool comprises an automatic resource allocation tool, wherein the non-transitory computer-readable storage medium further comprises computer-executable instructions to:

identify the at least one trigger event comprising an inflow resource transfer into a transactional resource of the user resources, wherein identifying the at least one trigger event comprises determining an inflow resource transfer value associated with the trigger event;

determine a savings resource of the user resources comprising a savings resource level; and initiate, automatically and in real-time, an outflow resource transfer from the transactional account such that at least a portion of the inflow resource transfer value is transferred to the savings resource, wherein the outflow resource transfer comprises an increase in the savings resource level.

14. The computer program product of claim 12, wherein, the at least one resource allocation tool comprises a restrictive reallocation tool, wherein the non-transitory computer-readable storage medium further comprises computer-executable instructions to:

identify the at least one trigger event comprising an initiation of an outflow resource transfer from the first user resource of the user resources via the first application of the mobile device, wherein the first application is a third party application configured to allow the user to initiate resource transfers from user resources based on verification of a first authentication credential; and generate a double verification requirement for the first application, wherein the double verification requirement is a second authentication for transferring resources via the first application.

15. The computer program product of claim 14, wherein the non-transitory computer-readable storage medium further comprises computer-executable instructions to:

input the double verification requirement into the first application, wherein inputting the double verification requirement includes inputting code that requires the user to verify using the double verification prior to allowing the application to transfer resources; and restrict the outflow resource transfer from the first user resource until the completion of the double verification requirement, wherein the completion of the double verification requirement comprises the successful validation of a second authentication credential received from the user.

16. The computer program product of claim 12, wherein, the at least one resource allocation tool comprises a visual reallocation tool, wherein the non-transitory computer-readable storage medium further comprises computer-executable instructions to:

identify the at least one trigger event comprising an initiation of an outflow resource transfer from the first user resource of the user resources via the first application of the mobile device, wherein the first application is a third party application configured to allow the user to initiate resource transfers from user resources through a first interface presented on the display; and generate a contextual visual representation of a goal product or service for the user resources.

17. The computer program product of claim 16, wherein the non-transitory computer-readable storage medium further comprises computer-executable instructions to:

present the generated contextual visual representation on the display of the mobile device;

lock, via the generated contextual visual representation presented in the display of the mobile device, the functionality of the first application for a predetermined time period; and restrict the outflow resource transfer until the identification of a second trigger event, wherein the second trigger event comprises at least one of elapse of the predetermined time period and receiving a user input comprising reallocation of the outflow resource transfer to a savings resource of the user resources.

18. The computer program product of claim 12, wherein, the at least one resource allocation tool comprises an interactive resource allocation tool, wherein the non-transitory computer-readable storage medium further comprises computer-executable instructions to:

identify the at least one trigger event comprising at least one of (i) a predetermined physical user gesture having a gesture pressure attribute within a predetermined range, (ii) an elapsed time period since a prior inflow transfer of the second user resource exceeding a predetermined threshold, (iii) initiation of an outflow resource transfer from the first user resource, and (iv) the user input comprising the first physical user gesture.

19. The computer program product of claim 18, wherein the non-transitory computer-readable storage medium further comprises computer-executable instructions to:

in response to the at least one trigger event, overlay, via the user resource application running in the background, an interactive resource allocation interface over the active application interface of the first application such that the interactive allocation resource interface displaces one or more portions of the active application interface on the display;

wherein the interactive resource allocation interface comprises a notification for the user to initiate the resource transfer, wherein the interactive resource interface is configured to receive user input comprising the first physical user gesture; and wherein the first physical user gesture comprises at least one of a tactile touch pattern, a tactile swipe motion, and change of orientation of the mobile device in a three dimensional space.

20. The computer program product of claim 12, wherein the at least one resource allocation tool comprises an interactive resource allocation tool, wherein the non-transitory computer-readable storage medium further comprises computer-executable instructions to:

identify the at least one trigger event comprising an outflow resource transfer from the first user resource of the user resources, wherein identifying the at least one trigger event comprises determining an outflow resource transfer value associated with the trigger event;

determine a savings resource of the user resources comprising a savings resource level; and in response to the outflow resource transfer from the first user resource, initiate a second resource transfer from the first user resource to the savings resource such that a first resource value of the first user resource is transferred to the savings resource, wherein the resource transfer comprises an increase in the savings resource level.

\* \* \* \* \*